US011269203B2

(12) United States Patent
Tam et al.

(10) Patent No.: US 11,269,203 B2
(45) Date of Patent: Mar. 8, 2022

(54) MULTIFOCAL SYSTEM WITH POLARIZATION-INDEPENDENT FOCUSING

(71) Applicant: Hong Kong Applied Science and Technology Research Institute Company Limited, Hong Kong (CN)

(72) Inventors: Ming Wai Alwin Tam, Hong Kong (CN); Xiaohan Wang, Hong Kong (CN); Zhuanyun Zhang, Hong Kong (CN); Xiuling Zhu, Hong Kong (CN); Kin Lung Kenny Chan, Hong Kong (CN)

(73) Assignee: Hong Kong Applied Science and Technology Institute Company Limited, Hong Kong (CN)

( * ) Notice: Subject to any disclaimer, the term of this patent is extended or adjusted under 35 U.S.C. 154(b) by 196 days.

(21) Appl. No.: 16/750,087

(22) Filed: Jan. 23, 2020

(65) Prior Publication Data

US 2021/0231991 A1    Jul. 29, 2021

(51) Int. Cl.
*G02F 1/03* (2006.01)
*G02F 1/07* (2006.01)
(Continued)

(52) U.S. Cl.
CPC ........... *G02F 1/03* (2013.01); *G02B 27/0172* (2013.01); *G02B 27/283* (2013.01);
(Continued)

(58) Field of Classification Search
None
See application file for complete search history.

(56) References Cited

U.S. PATENT DOCUMENTS

| 6,868,285 B2 | 3/2005 | Muller-Dethlefs |
| 7,186,990 B2 | 3/2007 | Powers et al. |
| (Continued) | | |

FOREIGN PATENT DOCUMENTS

| CN | 109100866 A | 12/2018 |
| CN | 208921975 U | 5/2019 |
| (Continued) | | |

OTHER PUBLICATIONS

Virkler et al.; Raman spectroscopy offers great potential for the nondestructive confirmatory identification of body fluids; Forensic Science International; Oct. 25, 2008; vol. 181, Issues 1-3; pp. e1-e5; Elsevier.

(Continued)

*Primary Examiner* — Darryl J Collins
*Assistant Examiner* — Tamara Y. Washington
(74) *Attorney, Agent, or Firm* — Spruson & Ferguson (Hong Kong) Limited

(57) ABSTRACT

Polarization-independent focusing is advantageously achieved by a multifocal system having a polarization beam splitter (PBS) to split an unpolarized light beam into two orthogonally linearly-polarized (LP) light beams. The two LP light beams are reflected by mirrors to travel in opposite directions and enter into a variable-focusing module at two ends thereof, respectively. The module includes waveplates to convert the LP light beams into two circularly-polarized (CP) light beams at both ends of an optical assembly. The optical assembly is formed with a stack of birefringent optical elements including at least one geometric phase lens and one polarization selector that may be electrically modulated to select the optical power in focusing the two CP light beams. Followed by the waveplates converting two focused CP light beams to two focused LP light beams and upon (Continued)

mirror reflection, the beams are finally recombined by the PBS to form one focused light beam.

19 Claims, 13 Drawing Sheets

(51) Int. Cl.
  *G02B 27/01* (2006.01)
  *G02F 1/01* (2006.01)
  *G02B 27/28* (2006.01)
  *G02F 1/139* (2006.01)

(52) U.S. Cl.
  CPC ......... *G02B 27/286* (2013.01); *G02F 1/0136* (2013.01); *G02F 1/07* (2013.01); *G02B 2027/0174* (2013.01); *G02F 1/1393* (2013.01)

(56) References Cited

U.S. PATENT DOCUMENTS

| | | | |
|---|---|---|---|
| 7,545,969 | B2 | 6/2009 | Bennett et al. |
| 8,467,053 | B2 | 6/2013 | Lednev et al. |
| 10,379,419 | B1 | 8/2019 | Lu et al. |
| 2009/0092281 | A1 | 4/2009 | Treado et al. |
| 2009/0174918 | A1 | 7/2009 | Zhuang et al. |
| 2017/0176752 | A1* | 6/2017 | Vieira ................ G02B 27/0172 |
| 2018/0039003 | A9 | 2/2018 | Tabirian et al. |
| 2018/0284464 | A1 | 10/2018 | Lu et al. |
| 2019/0269363 | A1 | 9/2019 | Vilenskii |

FOREIGN PATENT DOCUMENTS

| | | |
|---|---|---|
| JP | 2011-221395 A | 11/2011 |
| JP | 2011221395 A * | 11/2011 |

OTHER PUBLICATIONS

Nanda et al.; A rapid and noninvasive method to detect dried saliva stains from human skin using fluorescent spectroscopy; Journal of Oral and Maxillofacial Pathology; Jan.-Apr. 2011; vol. 15, Issue 1; pp. 22-25; Medknow Publications.

Fiedler et al.; Detection of Semen (Human and Boar) and Saliva on Fabrics by a Very High Powered UV-/VIS-Light Source; The Open Forensic Science Journal; Feb. 11, 2008; vol. 1; Bentham Science Publishers Ltd.

International Search Report and Written Opinion of PCT application No. PCT/CN2020/076324 issued from the International Search Authority dated Oct. 19, 2020.

B. Piccirillo, M. Picardi, L. Marrucci and E. Santamato, "Flat polarization-controlled cylindrical lens based on the Pancharatnam-Berry geometric phase," European Journal of Physics, 38(3):034007, May 2017.

S. Slussarenko et al., "Guiding light via geometric phases," Nature Photonics, Dec. 2015.

H. Yu, Z. Zhou, Y. Qi, X. Zhang and Q.-H. Wei, "Pancharatnam-Berry optical lenses," Journal of the Optical Society of America B, vol. 36, No. 5, D107-D111, May 2019.

* cited by examiner

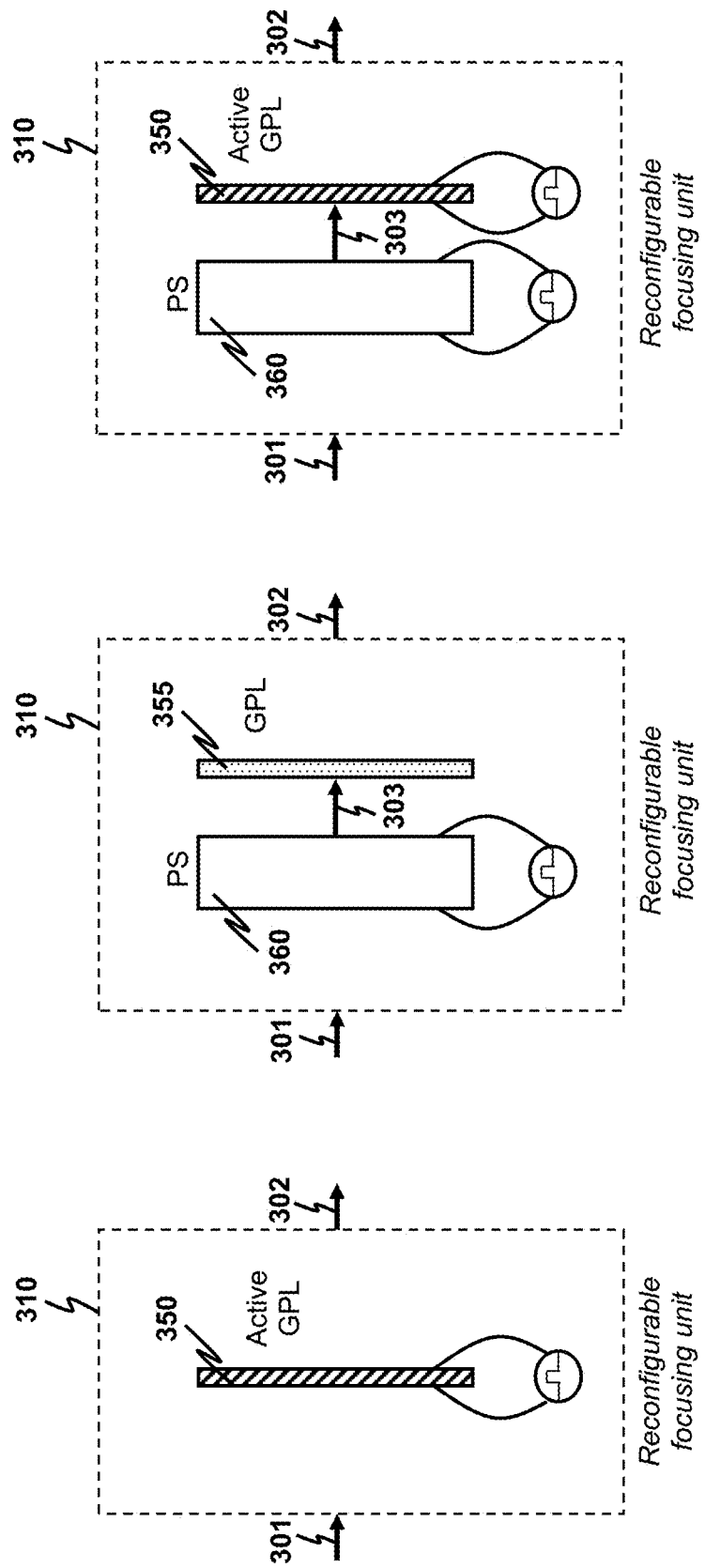

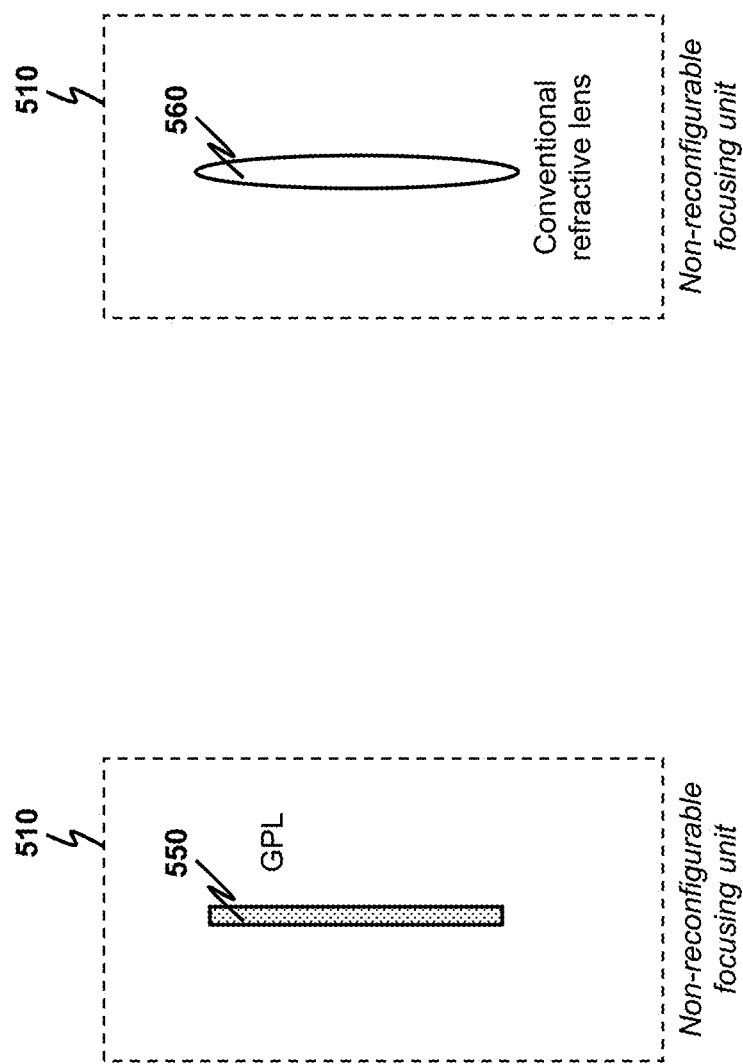

MULTIFOCAL SYSTEM WITH POLARIZATION-INDEPENDENT FOCUSING

LIST OF ABBREVIATIONS 3D three-dimensional
AC alternating current
AR augmented reality
ASIC application-specific integrated circuit
CP circularly-polarized
FPGA field-programmable gate array
GPL geometric phase lens
HWP half waveplate
IPS in-plane switching
LC liquid crystal
LHCP left-handed circularly polarized
LHS left hand side
LP linearly-polarized
PBS polarization beam splitter
PS polarization selector
QWP quarter waveplate
RHCP right-handed circularly polarized
RHS right hand side
TE transverse electric
TM transverse magnetic

FIELD OF THE INVENTION

The present invention relates generally to a system for providing focusing with variable and selectable optical power to a light beam. In particular, the present invention relates to such system realized with GPLs and offering polarization-independent focusing, enabling an unpolarized light beam to be focused with variable and selectable optical power.

BACKGROUND

Consider generation of a 3D AR image as an example for illustrating the technical problem considered herein.

The 3D AR image provides enhanced user experience in that a user perceives 3D presence of computer-generated objects under a real-world scene. In augmenting the real-world scene with multiple computer-generated objects when the user looks directly at the real-world scene, each of the objects is virtually formed at a distance in front of the eyes of the user. Most often, different objects are formed at different distances in the 3D AR image. To form an individual object, a light beam carrying the individual object generated by a projector is focused with an appropriate optical power to form a virtual image at a certain predetermined distance from the projector by a focusing system. The virtual image is reflected to the user's eyes by a reflector. The reflector, such as a holographic reflector, allows the real-world scene to pass through such that the virtual image after reflection is augmented into the real-world scene. Since multiple objects are augmented, the focusing system is required to provide different optical powers (viz., different choices of focal length) that are selectable such that different objects may appear at different depths to the user. That is, the focusing system provides multifocal focusing. The objects generated by the projector are focused one-by-one in a time division multiplexing manner to from respective virtual images at different distances. Fast switching from one focal length to another is required by the focusing system. If each virtual image is repeatedly displayed at a sufficiently high rate, the user perceives an illusion that all the computer-generated objects simultaneously appear in the real-world scene. Apart from provision of multifocal focusing and fast switching, it is preferable that the focusing system is also compact in size and consumes little power in operation. Both features enable the focusing system to be used in implementing a practical AR head-mounted device, for instance.

Existing focusing systems for providing multifocal focusing include a system using a compound lens formed with movable component lenses, and a system using an electrowetting lens. However, mechanical actions are involved in changing the foci or optical powers of these devices, making fast switching of foci not easy to realize. Other drawbacks of focusing adjustment based on mechanical actions include: causing unwanted vibration and shock; being bulky in size; and consuming a lot of power. Non-mechanical focusing devices are therefore preferred.

CN 208921975U discloses a polarization-dependent electrically controllable AR head-up display system relying on a switching waveplate to direct light to two different optical paths with different focusing powers. However, it results in only two selectable focal lengths, and the display system is bulky. The display system is not scalable to increase the total number of focal lengths or optical powers that are selectable. Furthermore, the display system supports polarization-dependent focusing. It is desirable if polarization-independent focusing is supported such that an unpolarized light source can be used without a need to waste light power due to filtering out light components of undesired polarization.

US 2018/0284464A1 discloses a compact polarization-dependent electrically controllable AR head-mounted display with an optical assembly for providing plural focusing depths. A single GPL is used as a focusing element in the optical assembly. The optical power provided by the GPL depends on the handedness of a CP light beam processed by the GPL. In addition, the GPL may be an active GPL, which can be switched on (viz., activated) to enable focusing an incoming CP light beam, or switched off (viz., deactivated) to let the CP light beam directly pass through. The optical assembly further includes a folded optics assembly to controllably increase an optical path traveled by the light beam by bouncing the light beams multiple times to lead to a change in the optical power provided by the optical assembly. However, the optical assembly only provides four selectable focusing depths or optical powers. Since realization of each choice of focusing depth makes an output light beam linearly polarize along a specific orientation, simply cascading a number of such optical assemblies together does not necessarily increase the number of selectable focusing depths. The optical assembly is not scalable. In addition, the optical assembly does not support polarization-independent focusing.

There is a need in the art for a system that provides multifocal focusing capability, enables fast switching, is scalable to easily increase the total number of selectable optical powers, and supports polarization-independent focusing. Preferably, the system is also compact and consumes little power in operation. This system is usable to build an AR display. Applications of the system to technical areas other than AR are possible.

SUMMARY OF THE INVENTION

The present invention provides first and second multifocal systems each for focusing an incoming light beam to form an outgoing light beam.

The second multifocal system comprises a PBS, a variable-focusing module, first and second mirrors, and an electronic controller.

The PBS is arranged to split the incoming light beam into first and second LP light beams mutually orthogonal to each other in polarization orientation.

The variable-focusing module is used for focusing an input LP light beam to form an output LP light beam with provision of multifocal focusing. The variable-focusing module has a first end and a second end such that the input LP light beam is allowed to enter into the variable-focusing module through one of the two ends to generate the output LP light beam leaving from another one of the two ends. A forward propagation direction is defined as a direction from the first end towards the second end. A backward propagation direction is defined as a direction from the second end towards the first end.

The variable-focusing module comprises a front-end QWP, an optical assembly, a rear-end QWP and a rear-end LC HWP. The front-end QWP is located at the first end for converting the input LP light beam received at the first end into an incident CP light beam. Both the input LP light beam and the incident CP light beam travel in the forward propagation direction. The optical assembly is configured to provide an optical power for focusing the incident CP light beam to form an exit CP light beam. The optical assembly is formed with a stack of optical elements including at least one GPL, and is electrically reconfigurable for supporting multifocal focusing. The rear-end QWP is used for converting the exit CP light beam to a first intermediate LP light beam. The rear-end LC HWP is located at the second end for transforming the first intermediate LP light beam into the output LP light beam leaving from the second end. The rear-end LC HWP is electrically reconfigurable to either maintain or 90°-rotate a polarization orientation of the first intermediate LP light beam in forming the output LP light beam.

The first and second mirrors are positioned or arranged such that the following results are obtained. First, the first mirror reflects the first LP light beam emitted from the PBS to the first end, causing the first LP light beam to travel along the forward propagation direction in the variable-focusing module to thereby form a third LP light beam leaving from the second end. Second, the second mirror reflects the second LP light beam emitted from the PBS to the second end, causing the second LP light beam to travel in the backward propagation direction in the variable-focusing module to thereby form a fourth LP light beam leaving from the first end. Third, the second mirror reflects the third LP light beam emitted from the second end to the PBS. Fourth, the first mirror reflects the fourth LP light beam leaving from the first end to PBS.

The electronic controller is configured to perform two tasks. The first task is to configure the optical assembly in the variable-focusing module to provide a desired optical power in focusing the incident CP light beam traveling in the forward propagation direction. It follows that the first LP light beam is focused in the variable-focusing module with the desired optical power. The second task is to configure the rear-end LC HWP such that the first and third LP light beams are orthogonal to each other in polarization orientation. It follows that the second and third LP light beams are same in polarization orientation, causing the second LP light beam to be focused in the variable-focusing module with the same desired optical power in forming the fourth LP light beam with the second and fourth LP light beams being orthogonal to each other in polarization orientation. Thereby, it advantageously allows the variable-focusing module to be reused in simultaneously focusing the first and second LP light beams.

The PBS is further arranged to combine the received third and fourth LP light beams to form the outgoing light beam. As a result, radiation power of the incoming light beam is fully utilized in creating the outgoing light beam while allowing the desired optical power in focusing the incoming light beam to be variable and selectable to support multifocal focusing even if the incoming light beam is unpolarized. Polarization-independent focusing of the incoming light beam is thus enabled.

Preferably, the first and second mirrors make angles of $22.5°-\theta/2$ and $67.5°+\theta/2$ from a reference axis, respectively, where the reference axis is in parallel to an incident direction of the incoming light beam that enters into the PBS, and $\theta$ is a non-zero angle offset, positive or negative. The presence of the non-zero angle offset enables the outgoing light beam to diverge away from the incoming light beam when the outgoing light beam travels so as to avoid occurrence of direct back reflection.

The first multifocal system comprises a first PBS, first and second variable-focusing modules, an electronic controller and a second PBS. The first PBS is used for splitting the incoming light beam into first and second LP light beams mutually orthogonal to each other in polarization orientation.

The first and second variable-focusing modules are used for focusing the first and second LP light beams to generate third and fourth LP light beams, respectively. An individual variable-focusing module for focusing an input LP light beam to form an output LP light beam is electrically reconfigurable for supporting multifocal focusing. In certain embodiments, the variable-focusing module comprises a front-end QWP, an optical assembly, a rear-end QWP and a rear-end LC HWP. The front-end QWP is used for converting the input LP light beam into an incident CP light beam. The optical assembly is configured to provide an optical power for focusing the incident CP light beam to form an exit CP light beam. The optical assembly is formed with a stack of optical elements including at least one GPL. The optical assembly is electrically reconfigurable for supporting multifocal focusing. The rear-end QWP is used for converting the exit CP light beam to a first intermediate LP light beam. The rear-end LC HWP is used for transforming the first intermediate LP light beam into the output LP light beam. The rear-end LC HWP is electrically reconfigurable to either maintain or 90°-rotate a polarization orientation of the first intermediate LP light beam in forming the output LP light beam.

The electronic controller is configured to configure the individual variable-focusing module to provide a desired optical power in focusing the input LP light beam such that the first and second LP light beams are focused with the same desired optical power. In certain embodiments, the electronic controller is configured to perform two tasks. The first task is to configure the optical assembly in each of the first and second variable-focusing modules to provide the desired optical power in focusing the incident CP light beam. The second task is to configure the rear-end LC HWP such that the third and fourth LP light beams are orthogonal to each other in polarization orientation.

The second PBS is used for combining the third and fourth LP light beams to generate the outgoing light beam. As a result, radiation power of the incoming light beam is fully utilized in creating the outgoing light beam while allowing the desired optical power in focusing the incoming light beam to be variable and selectable to support multifocal focusing even if the incoming light beam is unpolarized. Polarization-independent focusing of the incoming light beam is thus enabled.

In certain embodiments, the electronic controller is further configured to additionally configure the rear-end LC HWP such that the first and third LP light beams are same in polarization orientation and such that the second and fourth LP light beams are same in polarization orientation.

Each of the first and second individual variable-focusing modules may further comprise an additional lens for further focusing the output LP light beam before the output LP light beam exits a respective variable-focusing module.

The first multifocal system may further comprise an additional lens for further focusing the outgoing light beam before the outgoing light beam exits the system.

In each of the first and second multifocal systems, the optical assembly may be formed by serially cascading plural focusing units. An individual focusing unit used for focusing an input CP light beam to form an output CP light beam comprises a single lens for providing an incremental optical power in focusing the input CP light beam. The incremental optical power contributes to the optical power provided by the optical assembly. At least one of the focusing units is reconfigurable. The lens of an individual reconfigurable focusing unit is a GPL. In particular, the individual reconfigurable focusing unit is electrically controllable to change the incremental focusing power provided by said GPL via controllably modifying a handedness of the input CP light beam to a predetermined handedness before the input CP beam enters into said GPL or via controllably activating and deactivating said GPL. It causes the optical power provided by the optical assembly to be variable and selectable, whereby multifocal focusing is supported.

Preferably, the incremental focusing power of the GPL is changed at least via controllably modifying the handedness of the input CP light beam to the predetermined handedness before the input CP beam enters into the GPL.

In certain embodiments, all of the focusing units are reconfigurable.

The individual reconfigurable focusing unit may further comprise a PS for controllably modifying the handedness of the input CP light beam to the predetermined handedness. The PS is electrically reconfigurable to either reverse or maintain the handedness of the input CP light beam before the input CP light beam enters into the GPL.

Said GPL may be an active GPL electrically reconfigurable to either function as a normal GPL or function as an isotropic transparent medium without focusing the input CP light beam, thereby enabling said GPL to be controllably activated and deactivated.

In certain embodiments, the PS comprises a LC HWP electrically reconfigurable to either function as a normal HWP or function as an isotropic transparent medium.

In certain embodiments, the PS comprises a first QWP, an IPS LC HWP and a second QWP. The first QWP is used for converting a first CP light beam into a first LP light beam. The first CP light beam is the input CP light beam that enters into the individual reconfigurable focusing unit. The IPS LC HWP is used for transforming the first LP light beam into a second LP light beam. The IPS LC HWP is electrically reconfigurable to either maintain or 90°-rotate a polarization orientation of the first LP light beam in forming the second LP light beam. The second QWP is used for converting the second LP light beam into a second CP light beam. The second CP light beam is the input CP light beam having the predetermined handedness.

In certain embodiments, the lens of the individual focusing unit is an individual GPL regardless of whether the individual focusing unit is reconfigurable or not.

In certain embodiments, the focusing units are stacked together such that a sum of respective incremental optical powers provided by the focusing units gives the optical power provided by the optical assembly.

The present invention also provides a multifocal AR display for augmenting an external image onto a real-world scene during user viewing.

The multifocal AR display comprises a projector, a multifocal system realized as any of the embodiments of the first multifocal system and of the second multifocal system as disclosed, and a holographic reflector. The projector is used for generating an image-carrying light beam that carries the external image. The multifocal system is used for focusing the image-carrying light beam to form a modified image-carrying light beam and for providing multifocal focusing in focusing the image-carrying light beam. The holographic reflector is arranged to reflect the modified image-carrying light beam while allowing passage of a light beam that carries an image of the real-world scene so as to augment the external image onto the real-world scene during user viewing.

In certain embodiments, the projector comprises an optical diffuser, a microdisplay, a light source and a lens module. The microdisplay is used for displaying the external image. The light source illuminates the microdisplay to project the external image on the diffuser, causing the diffuser to emit the image-carrying light beam to be received by the multifocal system. The lens module is positioned between the microdisplay and the diffuser for focusing the external image originally displayed on the microdisplay onto the diffuser. The microdisplay may be a spatial light modulator.

Other aspects of the present disclosure are disclosed as illustrated by the embodiments hereinafter.

BRIEF DESCRIPTION OF THE DRAWINGS

FIG. 3A depicts a first embodiment of a reconfigurable focusing unit, where the reconfigurable focusing unit includes an active GPL.

FIG. 3B depicts a second embodiment of the reconfigurable focusing unit, where the reconfigurable focusing unit includes a PS followed by a GPL.

FIG. 3C depicts a third embodiment of the reconfigurable focusing unit, where the reconfigurable focusing unit includes a PS followed by an active GPL.

FIG. 5A depicts a first embodiment of a non-reconfigurable focusing unit.

FIG. 5B depicts a second embodiment of the non-reconfigurable focusing unit.

DETAILED DESCRIPTION

As used herein, "optical power" means a degree to which a lens, a minor, or any optical system converges or diverges light. The optical power of an optical device is given by the reciprocal of the focal length of the optical device.

As used herein, "focusing of a light beam" generically includes both scenarios of converging and diverging of the light beam unless otherwise specified. In focusing the light beam, the light beam converges if the light beam is processed by an optical focusing device having a positive optical power. Conversely, the light beam diverges if the optical focusing device has a negative optical power.

As used herein, "multifocal focusing" means focusing a light beam with an optical power that is selectable. Hence, a multifocal-focusing device for focusing a light beam provides plural choices of optical power for selection such that a selected optical power is used to focus the light beam. The multifocal-focusing device is also reconfigurable in its focal length.

As used herein, "GPL-based stacked-lens optical assembly" means an optical assembly formed with a stack of optical elements including at least one GPL, and is electrically reconfigurable for supporting multifocal focusing. Each of the aforesaid optical elements may be a GPL, a waveplate, a refractive lens, any LC-based optical element, etc. A GPL-based stacked-lens optical assembly exhibits polarization-dependent focusing.

The present invention is developed by utilizing some useful properties of GPLs. General overview and technical properties of GPLs can be found in disclosures of, e.g.: B. PICCIRILLO et al., "Flat polarization-controlled cylindrical lens based on the Pancharatnam-Berry geometric phase," *European Journal of Physics*, vol. 38, (2017) 034007 (15 pp); S. SLUSSARENKO et al., "Guiding light via geometric phases," *Nature Photonics*, vol. 10, pp. 571-575 (2016); and H. Y U et al., "Pancharatnam-Berry optical lenses," *Journal of the Optical Society of America B*, vol. 36, issue 5, pp. D107-D111 (2019).

Figure 1:
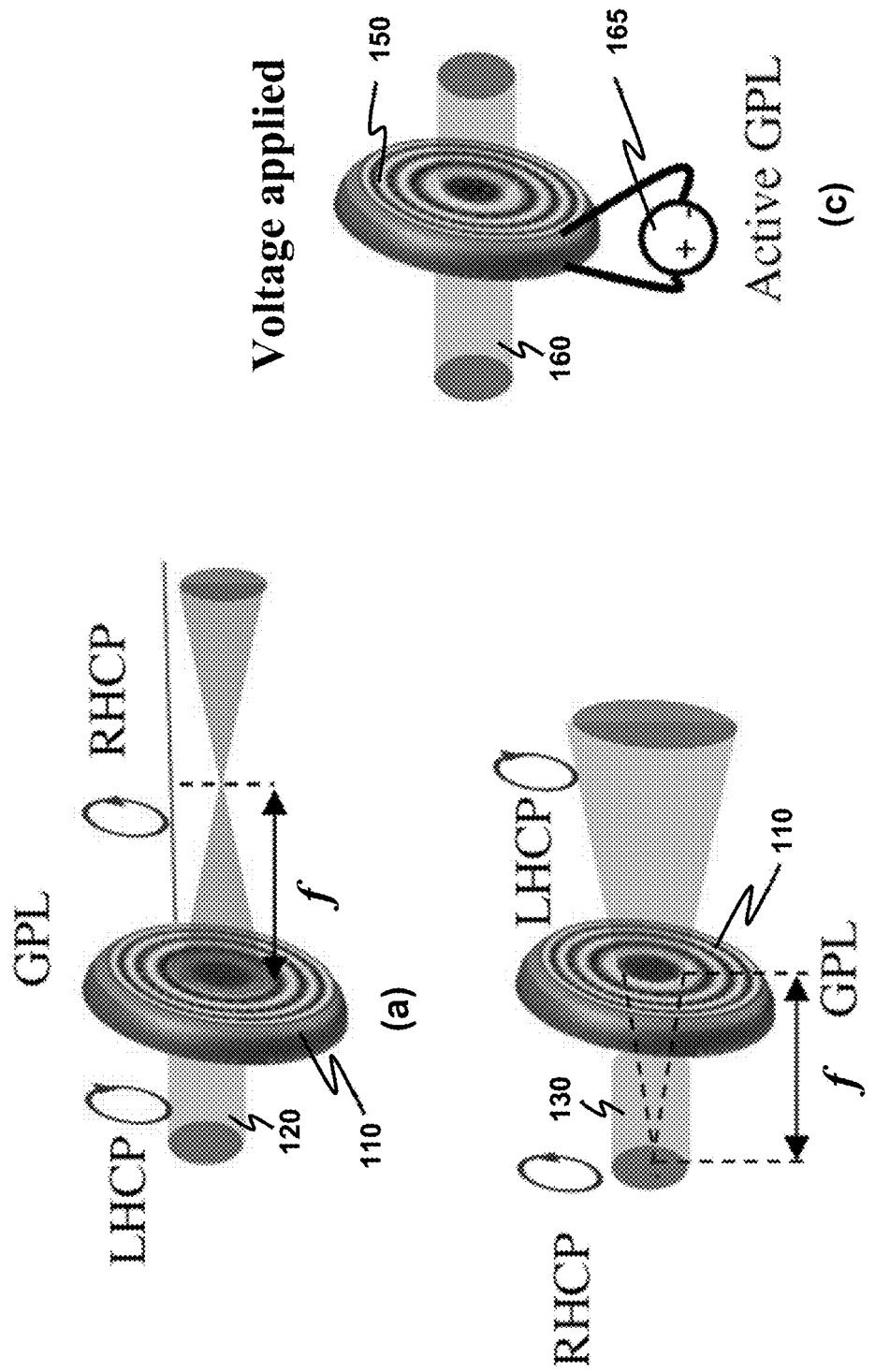
FIG. 1 depicts some typical cases of focusing an incident light beam by a GPL for illustrating some focusing behaviors of the GPL.

A GPL uses a spatial lens-like polarization dependent geometric phase profile to shape the wavefront of an outgoing light beam and hence modify the propagation direction of an incident light beam. Usually, the GPL is used to process the incident light beam that is CP. In particular, whether the incident light beam is converged or diverged depends on the handedness of the incident CP light beam. FIG. 1 illustrates various focusing behaviors of the GPL.

Insets (a) and (b) of FIG. 1 depict exemplary situations that a first light beam 120, which is LHCP, and a second light beam 130, which is RHCP, are incident from the LHS of a GPL 110, respectively. Upon leaving the GPL 110 from the RHS, the first light beam 120 converges (or is focused in general sense) whereas the second light beam 130 diverges (or is defocused in general sense). Thus, the focal length of the GPL 110 is f for a LHCP light beam and is −f for a RHCP light beam. The corresponding optical powers for the LHCP and RHCP light beams are 1/f and −1/f, respectively. Also note that the handedness of the incident light beam is reversed after leaving from the GPL 110. The first light beam 120 changes from LHCP to RHCP, and the second light beam 130 changes from RHCP to LHCP.

Inset (c) of FIG. 1 depicts the situation that an active GPL 150 is deactivated. The active GPL 150 is usually realized as a LC-based GPL with the LC film therein configured to receive an external voltage. The LC film provides the geometric phase profile to the active GPL 150. When an external voltage 165, usually an AC voltage waveform, is applied to the LC film, the active GPL 150 is deactivated and functions as an isotropic transparent medium without focusing an incident CP light beam 160 of any handedness. The handedness of the CP light beam 160 is not changed upon leaving the active GPL 150. When the external voltage 165 is removed, the active GPL 150 functions as a normal GPL with the focusing behaviors of the GPL 110.

Note that the GPL 110 is different from the active GPL 150 only in that the GPL 110 is not configured or arranged to receive an external voltage for reconfiguring the GPL 110 itself. A non-active GPL is used herein to refer to the GPL 110 or this kind of non-reconfigurable GPLs.

Other features of the GPL include the following. The GPL is usually realized as a flat, thin lens formed by a spatially-varying optically-uniaxial anisotropic layer on a transparent substrate. Thus, the GPL can be made thinner than a traditional refractive lens having a similar optical power. The diffraction efficiency of the GPL can be very high, even up to 100% for a given wavelength. The GPL is easily manufactured to have a large aperture size, and hence provides large fields of view for many applications. The GPL also has a large tunable optical-power range, potentially enabling a rich depth contrast for AR applications. Rapid switching from one optical power (or focal length) to another is feasible, allowing a fast response time. An active GPL enjoys advantages of using a low driving voltage (e.g., the peak voltage of the AC waveform 165) and consuming low power.

However, the GPL can only reactively provide two choices of focal length by changing the handedness of the incident light beam. For many practical applications, more different choices of focal length or optical power are desirable. One goal of the present invention is to conveniently provide multifocal focusing.

Disclosed herein are multifocal systems for light focusing. These multifocal systems make use of an optical assembly configured to provide an optical power for focusing an incident CP light beam to form an exit CP light beam.

Figure 2:
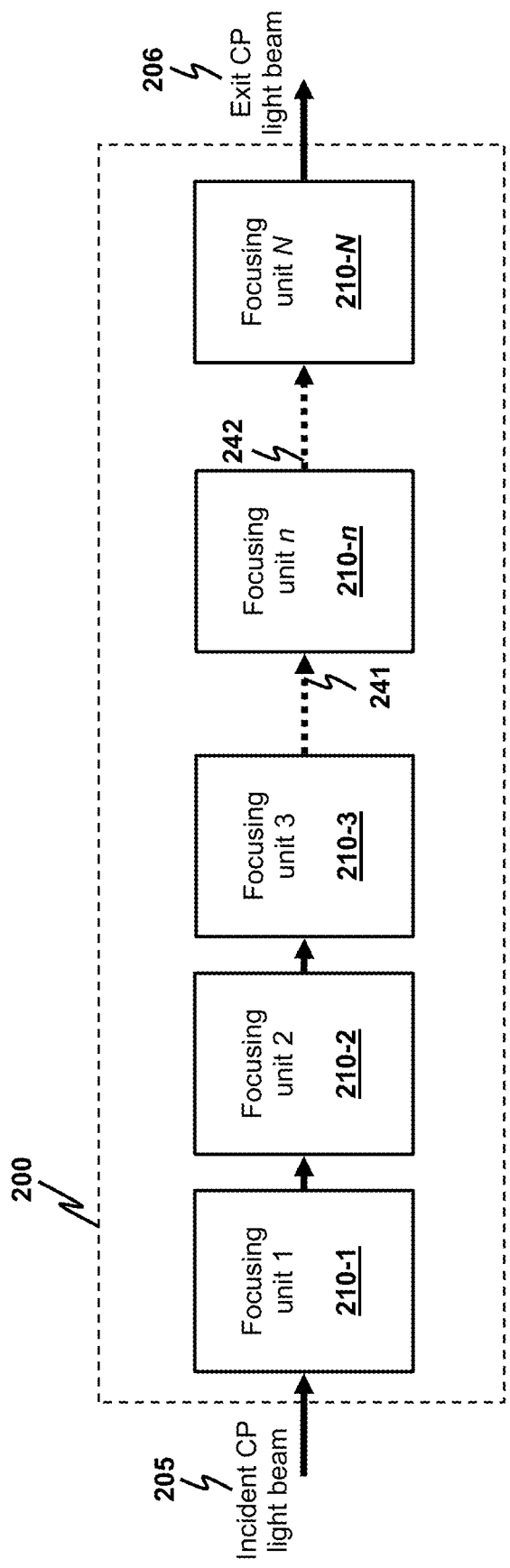
FIG. 2 depicts an optical assembly in accordance with an exemplary embodiment of the present invention, where the optical assembly is formed by plural focusing units, at least one of which is reconfigurable.

FIG. 2 depicts an optical assembly 200 in accordance with certain embodiments of the present invention. The optical assembly 200 is formed by serially cascading plural focusing units 210-1:N, where N≥2. An incident CP light beam 205 is received by the first focusing unit 210-1. The incident CP light beam 205 is gradually focused by the focusing units 210-1:N one-by-one as the incident CP light beam 205 travels along the chain of focusing units 210-1:N. An exit CP light beam 206 is formed and leaves the optical assembly 200 from the last focusing unit 210-N.

Consider the nth focusing unit 210-n as a representative focusing unit for illustration. The nth focusing unit 210-n receives an input CP light beam 241 to form an output CP light beam 242. The focusing unit 210-n comprises a single lens for providing an incremental optical power in focusing the input CP light beam 241. The focusing unit 210-n has one lens only, but may further comprise other non-focusing optical elements. It follows that the incremental optical power provided by the lens contributes to the optical power provided by the optical assembly 200.

Generally, the focusing units 210-1:N are tightly stacked together. The optical power provided by the optical assembly 200 is well approximated by a sum of respective incremental optical powers provided by the focusing units 210-1:N. If furthermore the focusing units 210-1:N are thin enough, the optical power provided by the optical assembly 200 is often calculated, with sufficient accuracy for uses in practical situations, by the sum of respective incremental optical powers provided by the focusing units 210-1:N. The focal length of the optical assembly 200 is calculated as the reciprocal of its optical power. If, on the other hand, one or more of the focusing units 210-1:N are spaced apart, those skilled in the art will appreciate that the focal length of the optical assembly 200 can be readily calculated by taking into consideration separations among the focusing units 210-1:N.

At least one of the focusing units 210-1:N is reconfigurable. Without loss of generality, consider that the nth focusing unit 210-n is reconfigurable as an example for illustrating a reconfigurable focusing unit. The lens of the focusing unit 210-n is a GPL, active or non-active. Advantageously, the focusing unit 210-n is electrically controllable to change the incremental focusing power provided by the aforesaid GPL via controllably modifying a handedness of the input CP light beam 241 to a predetermined handedness before the input CP beam 241 enters into the GPL or via controllably activating and deactivating the GPL. That is, the incremental optical power provided by the GPL is changeable by a first approach, or a second approach, or by taking both the first and second approaches together. The first approach is to modify the input CP light beam 241 to have the predetermined handedness. The second approach is to activate and deactivate the GPL in a controllable manner. Note that in using the second approach, the GPL is required to be an active GPL. By including one or more reconfigurable focusing units, the optical power provided by the optical assembly 200 is caused to be variable and selectable so that multifocal focusing is supported by the optical assembly 200.

A higher number of reconfigurable focusing units generally provide a higher number of optical-power levels that are selectable, making the optical assembly 200 scalable in adjusting the number of selectable optical-power levels that are provided. In one option, at least two of the focusing units 210-1:N are reconfigurable, thereby providing more than two optical-power levels that are selectable. In another option, all the focusing units 210-1:N are reconfigurable. Those skilled in the art may determine the required number of selectable optical-power levels according to practical situations.

FIGS. 3A-3C depict three embodiments of a reconfigurable focusing unit 310. The reconfigurable focusing unit 310 is arranged to focus an input CP light beam 301 to generate an output CP light beam 302.

Refer to FIG. 3A. The reconfigurable focusing unit 310 includes an active GPL 350 electrically reconfigurable to either function as a normal GPL or function as an isotropic transparent medium without focusing the input CP light beam 301. Accordingly, the aforesaid GPL of the focusing unit 210-n is realized as the active GPL 350. Thereby, the aforesaid GPL is enabled to be controllably activated and deactivated.

Refer to FIG. 3B. The reconfigurable focusing unit 310 includes a PS 360 and a GPL 355. The PS 360 is used for controllably modifying the handedness of the input CP light beam 301 to the predetermined handedness so as to generate an intermediate CP light beam 303. The PS 360 is electrically reconfigurable to either reverse or maintain the handedness of the input CP light beam 301 before the input CP light beam 301 enters into the GPL 355. The intermediate CP light beam 303, having the predetermined handedness, is received by the GPL 355 for focusing. Accordingly, the aforesaid GPL of the focusing unit 210-n is realized as the GPL 355, which is non-active.

Refer to FIG. 3C. The reconfigurable focusing unit 310 includes the PS 360 and the active GPL 350. Accordingly, the aforesaid GPL of the focusing unit 210-n is realized as the active GPL 350.

As a remark, the reconfigurable focusing unit 310 depicted in FIG. 3A is used for taking the above-mentioned second approach in changing the incremental focusing power of the GPL, the one depicted in FIG. 3B for taking the first approach, and the one depicted in FIG. 3C for taking both the first and second approaches.

As a further remark, the PS 360 can be realized as a LC HWP operating at an electrically controlled birefringence LC switching mode. It follows that the PS 360 is capable of providing fast switching from reversing the handedness of the input CP light beam 301 to maintaining the handedness and vice versa by using waveplate(s). This switching is usually faster than switching on and off the active GPL 350. Thus, the reconfigurable focusing unit 310 of FIG. 3B in general has a faster response time than the one of FIG. 3A. The faster response time is particularly useful in AR applications in that focus jittering during changing from one focus to another focus in multifocal focusing can be further suppressed.

The reconfigurable focusing unit 310 of FIG. 3C includes both the PS 360 and the active GPL 350. Fast switching is also supported if switching from one focus to another one is limited to reconfiguring the PS 360 but not the active GPL 350. This fast switching is still useful to certain AR applications in that the user may be sensitive to jittering during some critical moments in enjoying AR experience, but would be tolerant in other moments.

In view of the fast-switching advantage, it is preferable that in an individual reconfigurable focusing unit of the optical assembly 200, the incremental focusing power of the GPL is changed at least via controllably modifying the handedness of the input CP light beam to the predetermined handedness before the input CP beam enters into the GPL.

The reconfigurable focusing unit 310 of FIG. 3C generally provides a higher number of selectable levels of optical power in comparison to the other two units of FIGS. 3A and 3B. The reconfigurable focusing unit 310 of FIG. 3A enjoys the lowest material cost and highest transmittance among the three units of FIGS. 3A-3C.

Although FIGS. 3A-3C do not depict optical elements other than the active GPL 350, the PS 360 and the GPL 355 in the reconfigurable focusing unit 310, in practice one or more additional optical elements, such as an inert glass slab for protecting the active GPL 350, etc., may be included as deemed appropriate by those skilled in the art.

Figure 4B:
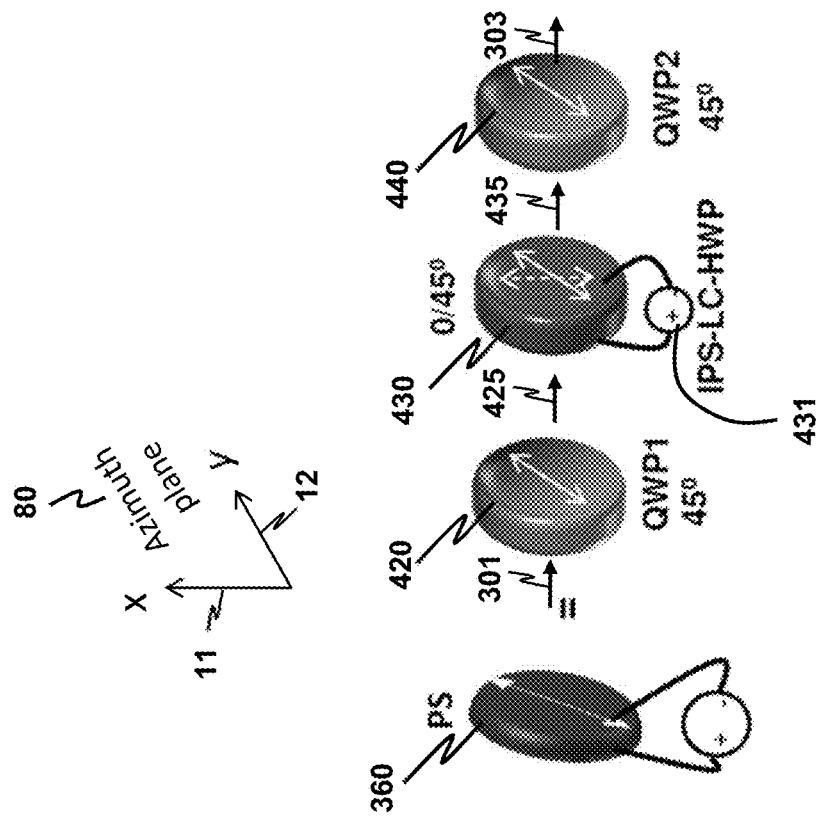
FIG. 4B depicts a second embodiment of the PS, where an IPS LC HWP is used for enabling fast switching.
Figure 4A:
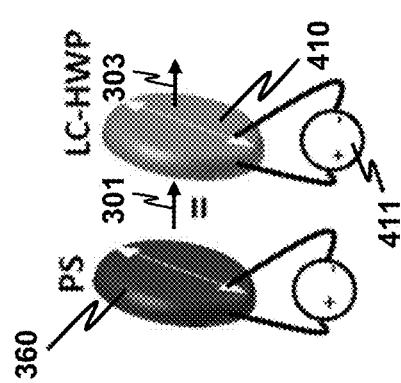
FIG. 4A depicts a first embodiment of the PS, where the PS is realized as a LC HWP.

FIGS. 4A and 4B depict two embodiments of the PS 360.

As shown in FIG. 4A, the PS 360 comprises a LC HWP 410 electrically reconfigurable to either function as a normal HWP or function as an isotropic transparent medium. When a voltage source 411 applies a voltage to the LC HWP 410, the LC HWP 410 functions as the isotropic transparent medium. The input CP light beam 301 and the intermediate CP light beam 303 have the same handedness. In the absence of the voltage applied to the LC HWP 410, the LC HWP 410 functions as the normal HWP so that the intermediate CP light beam 303 has a handedness opposite to the handedness of the input CP light beam 301. Whether the voltage source 411 applies the voltage or not is determined by whether the input CP light beam 301 has the predetermined handedness.

As shown in FIG. 4B, the PS 360 comprises a first QWP 420, an IPS LC HWP 430 and a second QWP 440. A reference azimuth plane 80 formed by an x-axis 11 and a y-axis 12 is employed to illustrate orientation of optical elements in the PS 360. The first QWP 420, the IPS LC HWP 430 and the second QWP 440 are positioned in parallel to the azimuth plane 80. The first QWP 420 is used to convert the input CP light beam 301 into a first LP light beam 425. The IPS LC HWP 430 is used for transforming the first LP light beam 425 into a second LP light beam 435. In particular, the IPS LC HWP 430 is electrically reconfigurable to either maintain or 90°-rotate a polarization orientation of the first LP light beam 425 in forming the second LP light beam 435. The second QWP 440 is used for converting the second LP light beam 435 into the intermediate CP light beam 303. In practical realization of the PS 360, the first QWP 420 and the second QWP 440 have their optics axes oriented at 45° to the x-axis 11. When a voltage source 431 does not apply a voltage to the IPS LC HWP 430, the optics axis of the IPS LC HWP 430 is also at 45° to the x-axis 11. When the voltage source 431 applies a voltage to the IPS LC HWP 430, its optics axis is re-oriented along the x-axis 11. Whether the voltage source 431 applies the voltage or not is determined by whether the input CP light beam 301 has the predetermined handedness.

Although the second embodiment of the PS 360 (as shown in FIG. 4B) is more complex than the first embodiment (as shown in FIG. 4A), a major advantage of the second embodiment of the PS 360 is that the use of IPS LC HWP 430 enables fast switching from reversing the handedness of the input CP light beam 301 to maintaining the handedness and vice versa.

FIGS. 5A and 5B depict two embodiments of a non-reconfigurable focusing unit 510. The two embodiments are provided for illustrating realization of the optical assembly 200; those skilled in the art will appreciate that other realizations of the non-reconfigurable focusing unit 510 are also possible. In FIG. 5A, the non-reconfigurable focusing unit 510 is realized with a non-active GPL 550. In FIG. 5B, the non-reconfigurable focusing unit 510 includes a conventional refractive lens 560. Although a convex lens with a positive optical power is shown in FIG. 4B, it is possible a concave lens with a negative optical power is used as deemed appropriate by those skilled in the art.

In practical realization of the optical assembly 200, it is possible that the lens of each of the focusing units 210-1:N is realized as an individual GPL, active or non-active, regardless of whether an individual focusing unit is reconfigurable or not. Since GPLs are flat and thin, and since various HWPs and QWPs are also flat and thin, all the focusing units 210-1:N may be stacked together tightly. It follows that the sum of respective incremental optical powers provided by the focusing units 210-1:N gives the optical power provided by the optical assembly 200.

Figure 6B:
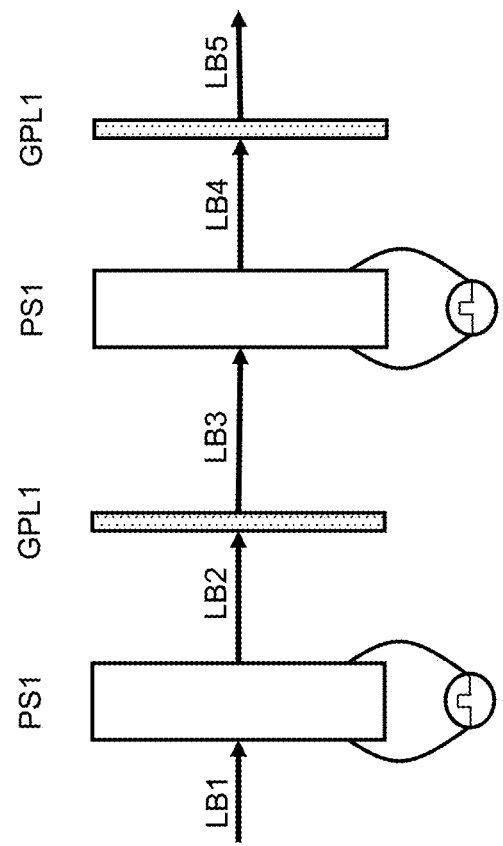
FIG. 6B depicts a second prototype optical assembly for demonstrating the ability of the optical assembly to provide different optical powers.
Figure 6A:
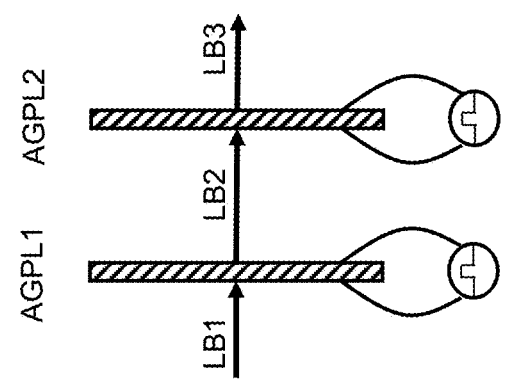
FIG. 6A depicts a first prototype optical assembly for demonstrating the ability of the optical assembly to provide different optical powers.

The provision of multifocal focusing by the optical assembly 200 is demonstrated as follows by considering a specific case of N=2 with two reconfigurable focusing units. FIGS. 6A and 6B depict two prototype optical assemblies 610, 620 under consideration. The prototype optical assemblies 610, 620 are realized with individual reconfigurable focusing units of FIG. 3A and of FIG. 3B, respectively. Analysis for a prototype optical assembly realized with the individual reconfigurable focusing unit of FIG. 3C is similar, and is not given here for brevity.

In FIG. 6A, AGPL1 and AGPL2 are two active GPLs; LB1 is an incident CP light beam; LB3 is an exit CP light beam; LB2 is an intermediate CP light beam between AGPL1 and AGPL2. In FIG. 6B, PS1 and PS2 are two PSs; GPL1 and GPL2 are two GPLs; LB1 is an incident CP light beam; LB5 is the exit CP light beam; LB2, LB3 and LB4 are intermediate CP light beams. Let $P_1$ be the optical power provided by GPL1, or AGPL1 not applied with an external voltage, for focusing a LHCP light beam, so that $-P_1$ is the optical power for focusing a RHCP light beam. Let $P_2$ be the optical power provided by GPL2, or AGPL2 not applied with an external voltage, for focusing a LHCP light beam, so that $-P_2$ is the optical power for focusing a RHCP light beam. The optical power of AGPL1 (or AGPL2) drops to zero when applied with an external voltage. Table 1 lists the optical powers provided by the prototype optical assembly 610 under different configurations (i.e. states) of AGPL1 and APGL2. Table 2 lists the corresponding optical powers provided by the prototype optical assembly 620. A "0" under PS1, PS2, AGPL1 or AGPL2 stands for a voltage-off state, where an external voltage is not applied to an optical element under consideration. Conversely, a "1" stands for a voltage-on state, where the external voltage is applied (to deactivate the optical element under consideration). As a remark, it is not always true that all types of LC cells achieve the above-mentioned two states by applying or not applying the external voltage. It is true for a typical planar aligned electrically controlled birefringence LC cell, but generally not for a ferroelectric LC cell. A voltage with opposite polarity is necessary to be applied to the FLC cell to achieve the voltage-off state.

TABLE 1

Optical powers provided by the prototype optical assembly 610. (L: LHCP; R: RHCP)

| State | AGPL1 | AGPL2 | LB1 | LB2 | LB3 | Overall optical power |
|---|---|---|---|---|---|---|
| 1 | 0 | 0 | L | R | L | $P_1 - P_2$ |
| 2 | 0 | 1 | L | R | R | $P_1$ |
| 3 | 1 | 0 | L | L | R | $P_2$ |
| 4 | 1 | 1 | L | L | L | 0 |
| 1 | 0 | 0 | R | L | R | $-P_1 + P_2$ |

TABLE 1-continued

Optical powers provided by the prototype
optical assembly 610. (L: LHCP; R: RHCP)

| State | AGPL1 | AGPL2 | LB1 | LB2 | LB3 | Overall optical power |
|---|---|---|---|---|---|---|
| 2 | 0 | 1 | R | L | L | $-P_1$ |
| 3 | 1 | 0 | R | R | L | $-P_2$ |
| 4 | 1 | 1 | R | R | R | 0 |

TABLE 2

Optical powers provided by the prototype
optical assembly 620. (L: LHCP; R: RHCP)

| State | PS1 | PS2 | LB1 | LB2 | LB3 | LB4 | LB5 | Overall optical power |
|---|---|---|---|---|---|---|---|---|
| 1 | 0 | 0 | L | R | L | R | L | $-P_1 - P_2$ |
| 2 | 0 | 1 | L | R | L | L | R | $-P_1 + P_2$ |
| 3 | 1 | 0 | L | L | R | L | R | $P_1 + P_2$ |
| 4 | 1 | 1 | L | L | R | R | L | $P_1 - P_2$ |
| 1 | 0 | 0 | R | L | R | L | R | $P_1 + P_2$ |
| 2 | 0 | 1 | R | L | R | R | L | $P_1 - P_2$ |
| 3 | 1 | 0 | R | R | L | R | L | $-P_1 - P_2$ |
| 4 | 1 | 1 | R | R | L | L | R | $-P_1 + P_2$ |

The results listed in Tables 1 and 2 show that the optical assembly 200 can provide different optical powers in focusing to facilitate multifocal focusing. In general, for the optical assembly 200 having N focusing units (210-1:N), the number of focusing states is $2^N$.

In AR applications, a multifocal projector may be realized by including a normal projector for projecting an image-carrying light beam, a linear polarizer for converting the image-carrying light beam to a LP light beam, a QWP for converting the LP light beam into a CP light beam, the optical assembly 200 for processing the CP light beam so as to provide multifocal focusing to the image-carrying light beam, and an electronic controller for controlling and configuring the optical assembly 200. However, applying the linear polarizer to the image-carrying light beam, which is unpolarized, results in a 50% loss of light power. It is undesirable.

The optical assembly 200 has a stacked-lens arrangement having at least one GPL, and exhibits polarization-dependent focusing. The Inventors have identified that if the optical assembly 200 is replaced by another GPL-based stacked-lens optical assembly, which exhibits polarization-dependent focusing, the same significant waste of light power also results. As mentioned above, a GPL-based stacked-lens optical assembly is an optical assembly formed with a stack of optical elements including at least one GPL, and is electrically reconfigurable for supporting multifocal focusing. Each of the embodiments of the optical assembly 200 is an instance of the GPL-based stacked-lens optical assembly. Other examples of the GPL-based stacked-lens optical assembly include optical devices disclosed in U.S. Pat. No. 10,379,419B1 and US 2009/0174918A1.

It is desirable if multifocal focusing can be achieved without a significant loss of light power. The multifocal systems disclosed herein are intended to receive unpolarized light and perform polarization-independent focusing so that a high power efficiency (near 100%) is achievable.

The optical assembly 200 is designed to receive the incident CP light beam 205 and hence generate the exit CP light beam 206. In the development of the multifocal systems, it will soon become evident that it is advantageous to first develop an optical device for providing multifocal focusing to an input LP light beam to thereby obtain an output LP light beam. The disclosed multifocal systems are built on this optical device, which is herein referred to as a variable-focusing module. The variable-focusing module is electrically reconfigurable for supporting multifocal focusing.

Figure 7:
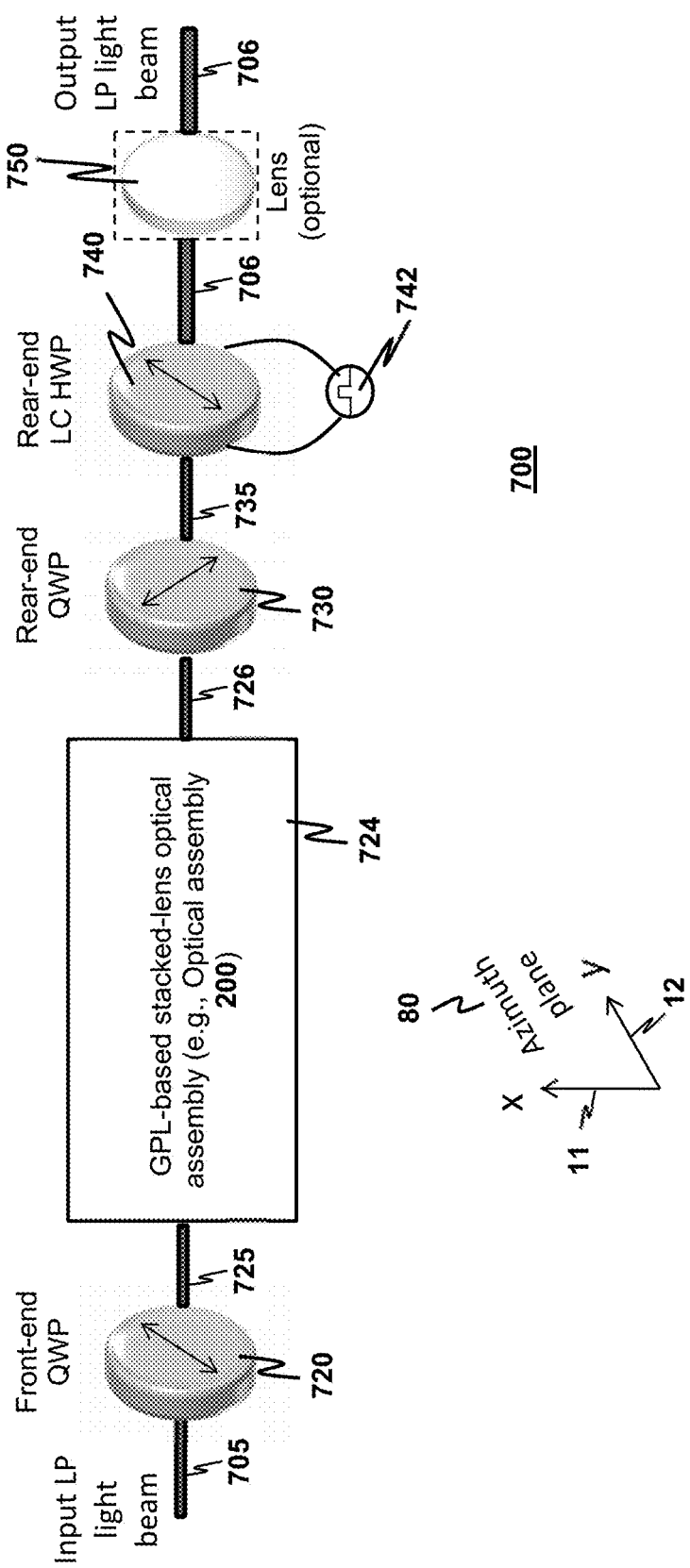
FIG. 7 depicts a variable-focusing module for focusing an input LP light beam to form an output LP light beam in accordance with certain embodiments of the present invention.

FIG. 7 depicts a variable-focusing module 700 for focusing an input LP light beam 705 to form an output LP light beam 706 in accordance with certain embodiments of the present invention. The variable-focusing module 700 comprises a front-end QWP 720, a GPL-based stacked-lens optical assembly 724, a rear-end QWP 730 and a rear-end LC HWP 740. In certain embodiments, the GPL-based stacked-lens optical assembly 724 is realized as the optical assembly 200. When the input LP light beam 705 enters into the variable-focusing module 700, the front-end QWP 720 converts the input LP light beam 705 into an incident CP light beam 725 to be processed by the GPL-based stacked-lens optical assembly 724. The GPL-based stacked-lens optical assembly 724 is configured to focus the incident CP light beam 725 to form an exit CP light beam 726. Multifocal focusing in focusing the incident CP light beam 725 is supported by the GPL-based stacked-lens optical assembly 724. The rear-end QWP 730 receives the exit CP light beam 726 and converts the exit CP light beam 726 to a first intermediate LP light beam 735. The rear-end LC HWP 740 is electrically reconfigurable to either maintain or 90°-rotate a polarization orientation of the first intermediate LP light beam 735 in forming the output LP light beam 706.

The reference azimuth plane 80 formed by the x-axis 11 and y-axis 12 is employed to illustrate orientation of optical elements in the variable-focusing module 700. Consider the specific condition that the input LP light beam 705 has a polarization orientation in parallel to the x-axis 11. The front-end QWP 720 has an optics axis oriented at 45° from the x-axis 11 so as to convert the input LP light beam 705 to a CP light beam (i.e. the incident CP light beam 725). The rear-end QWP 730 has its optics axis oriented at −45° from the x-axis 11. When the exit CP light beam 726 is converted to the first intermediate LP light beam 735 by the rear-end QWP 730, the polarization of the first intermediate LP light beam 735 is either along the x-axis 11 or along the y-axis 12. The rear-end LC HWP 740 has its optics axis oriented at 45° from the x-axis 11. When a voltage source 742 is switched off, the polarization orientation of the first intermediate LP light beam 735 is rotated by 90° to form the output LP light beam 706. Conversely, when the voltage source 742 is switched on to provide a voltage, the rear-end LC HWP 740 functions as an isotropic transparent medium, causing no change to polarization orientation of the first intermediate LP light beam 735 in forming the output LP light beam 706.

An optional lens 750 may be included in the variable-focusing module 700 for further focusing the output LP light beam 706 before the output LP light beam 706 exits the variable-focusing module 700. With the lens 750 that offers a certain fixed optical power, it becomes not necessary to include another refractive lens in the optical assembly 200 (as a realization of the GPL-based stacked-lens optical assembly 724) so that the optical assembly 200 is composed of flat, thin optical elements only. Since the front-end QWP 720, the rear-end QWP 730 and the rear-end LC HWP 740 are also flat, thin optical elements, integration of these optical elements with the optical assembly 200 in manufacturing is simplified.

A first aspect of the present invention is to provide a first multifocal system for focusing an incoming light beam to form an outgoing light beam. In addition, radiation power of the incoming light beam is fully utilized by the system in creating the outgoing light beam. The first multifocal system provides advantages at least on polarization-independent focusing and high power efficiency.

The goal of fully utilizing the radiation power is achieved by splitting the unpolarized incoming light beam into two LP light beams, individually focusing the two LP light beams with the same optical power, and finally combining the two LP light beams after focusing is done.

Figure 8:
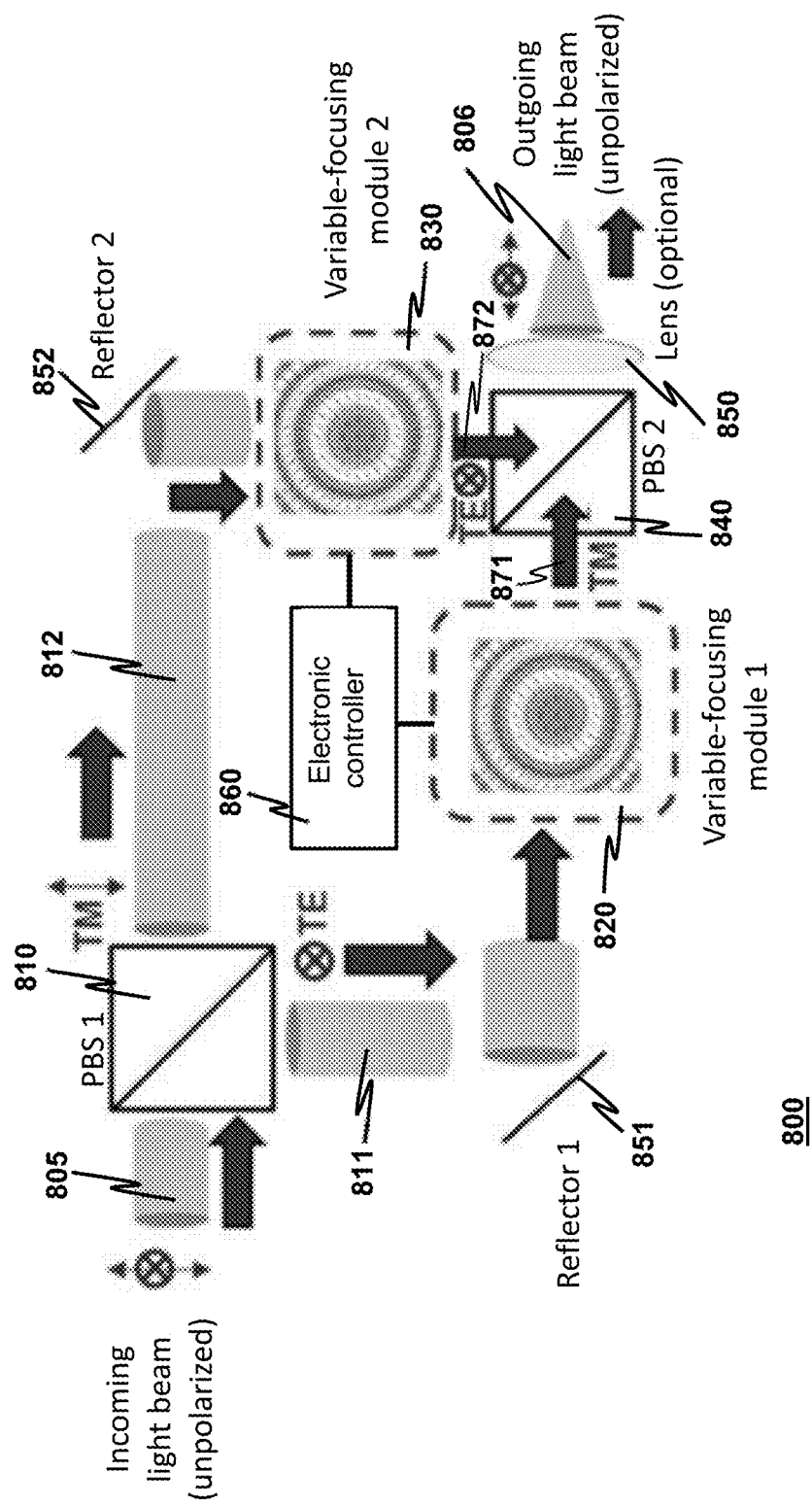
FIG. 8 depicts a first multifocal system for focusing an incoming light beam to form an outgoing light beam, where radiation power of the incoming light beam is fully utilized in creating the outgoing light beam.

Exemplarily, the first multifocal system is shown in FIG. 8, which depicts a first multifocal system 800 that receives an incoming light beam 805, which is unpolarized, and generates an outgoing light beam 806, which is also unpolarized. The system 800 comprises a first PBS 810, a first variable-focusing module 820, a second variable-focusing module 830, an electronic controller 860 and a second PBS 840.

The first PBS 810 is used for splitting the incoming light beam 805 into a first LP light beam 811 and a second LP light beam 812, where the first and second LP light beams 811, 812 are mutually orthogonal to each other in polarization orientation. As an example shown in FIG. 8 for illustration, the first LP light beam 811 is a TE polarized light beam and the second LP light beam 812 is a TM polarized light beam.

The first and second variable-focusing modules 820, 830 are used for focusing the first and second LP light beams 811, 812 to generate third and fourth LP light beams 871, 872, respectively. Each of the first and second variable-focusing modules 820, 830 is realized by any of the embodiments of the variable-focusing module 700 disclosed above. In addition, the first and second variable-focusing modules 820, 830 may be realized with the same embodiment, or different embodiments, of the variable-focusing module 700. Since the first and second LP light beams 811, 812 are orthogonal in polarization orientation, it follows that respective front-end QWPs in the first and second variable-focusing modules 820, 830 are positioned such that optics axes of the two front-end QWPs are orthogonal to each other.

The electronic controller 860 is configured to configure each of the first and second variable-focusing modules 820, 830 to provide a desired optical power in focusing each of the first and second LP light beams 811, 812 such that the first and second LP light beams 811, 812 are focused with the same desired optical power. In certain embodiments, the electronic controller 860 is configured and programmed to perform the following tasks. A first task is to configure the optical assembly 200 in each of the first and second variable-focusing modules 820, 830 to provide the desired optical power in focusing a respective incident CP light beam. A second task is to configure the rear-end LC HWP 640 in each of the first and second variable-focusing modules 820, 830 such that the third and fourth LP light beams 871, 872 are orthogonal to each other in polarization orientation.

The electronic controller 860 may be implemented by, e.g., a general-purpose computing processor, a special-purpose processor, a microcontroller, an ASIC, any programmable device such as a FPGA, or a combination thereof. Peripheral devices such as line drivers for driving the optical assembly 200 may be included in the implementation of the electronic controller 860. Those skilled in the art will appreciate that other practical implementations of the electronic controller 860 are possible and can be designed according to knowledge in the art.

The second PBS 840 is used for combining the third and fourth LP light beams 871, 872 to generate the outgoing light beam 806. As a result, the radiation power of the incoming light beam 805 is fully utilized in forming the outgoing light beam 806 while allowing the desired optical power in focusing the incoming light beam 805 to be variable and selectable to support multifocal focusing.

Combination of the third and fourth LP light beams 871, 872 by the second PBS 840 is possible as these two light beams 871, 872 have mutually orthogonal polarization orientations. In one embodiment, the electronic controller 860 is further configured to additionally configure the rear-end LC HWP 640 in each of the first and second variable-focusing modules 820, 830 such that the first and third LP light beams 811, 871 are orthogonal in polarization orientation and such that the second and fourth LP light beams 812, 872 are also orthogonal in polarization orientation. The propagation direction of the outgoing light beam 806 is the one as shown in FIG. 8.

Note that if the third and fourth LP light beams 871, 872 become TE and TM polarized light beams, respectively, the propagation direction of the outgoing light beam 806 is 90° rotated from the one shown in FIG. 8.

Optionally, a first reflector 851 (a second reflector 852) is used to reflect the first LP light beam 811 (the second LP light beam 812) from the first PBS 810 to the first variable-focusing module 820 (the second variable-focusing module 830).

An optional lens 850 may also be included in the system 800 for further focusing the outgoing light beam 806 before the outgoing light beam 806 exits the system 800.

The system 800 provides the advantage of fully utilizing the radiation power of the incoming light beam 805 to form the outgoing light beam 806 at the expense of doubling the required hardware (viz., requiring two variable-focusing modules and two PBS's). The doubling in the required hardware not only increases the cost of materials in building the system 800, but also increases the physical size thereof. It is desirable if the aforementioned advantage in power efficiency is maintained while the required hardware is reduced.

A second aspect of the present invention is to provide a second multifocal system for focusing an incoming light beam to form an outgoing light beam. The system enables the radiation power of the incoming light beam to be fully utilized in creating the outgoing light beam but the required hardware is reduced when compared to the first multifocal system. The second multifocal system provides advantages at least on polarization-independent focusing, high power efficiency, reduced material cost and reduced space requirement.

The Inventors have noticed that the variable-focusing module 700 is capable of simultaneously focusing two LP light beams provided some requirements on the two LP light beams are fulfilled. It enables a reduction of required hardware. Consider focusing a first input LP light beam and a second input LP light beam. The module 700 has two ends. The first input LP light beam enters into a first end of the module 700 and thereby produces a first output LP light beam leaving from a second end of the module 700. At the same time, the second input LP light beam enters into the second end and thereby produces a second output LP light beam leaving from the first end. Thus, the module 700 is reused so as to simultaneously focus the two LP light beams. The Inventors have found a result that if the first input LP light beam and the first output LP light beam are orthogonal in polarization orientation, and if the first output LP light beam and the second input LP light beam have the same polarization orientation, the first and second input light beams are focused with the same optical power provided by the module 700. Simply speaking, two orthogonal LP light beams traveling in opposite directions and entering the module 700 via the two opposite ends thereof are simultaneously focused by the module 700. This result is explained as follows with the aid of FIGS. 11-13.

Figure 11:
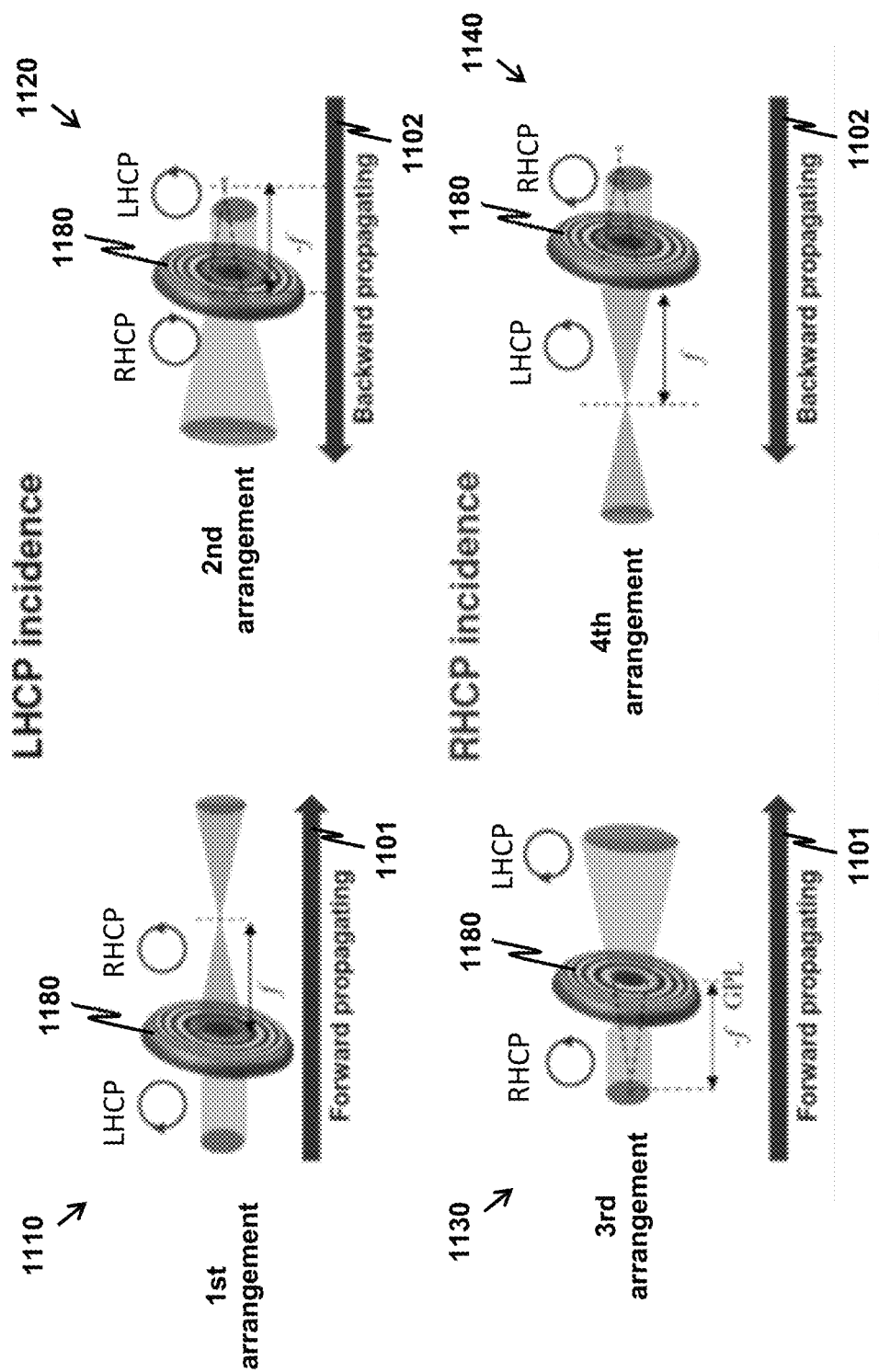
FIG. 11 illustrates the non-reciprocal focusing behavior of a GPL for light beams entering from a forward propagation direction and from a backward propagation direction.

FIG. 11 illustrates the non-reciprocal focusing behavior of a GPL 1180 for light beams entering from a forward propagation direction 1101 and from a backward propagation direction 1102. For illustration purposes, the forward propagation direction 1101 is defined as a traveling direction from the LHS to the RHS of the GPL 1180, and the backward propagation direction 1102 is opposite to the forward propagation direction 1101. The GPL 1180 is characterized by a spatial distribution of optics axis r(x, y) over the cross-sectional surface of the GPL 1180. This optics-axis distribution causes the GPL 1180 to respond differently in focusing behavior depending on the handedness of an incident CP light beam. In a first arrangement 1110, a LHCP light beam travels along the forward propagation direction 1101 and is incident on the GPL 1180 from the LHS thereof. The LHCP light beam is converged to form a RHCP light beam, causing the GPL 1180 to have a focal length of f. If, conversely, the LHCP light beam travels along the backward propagation direction 1102 and is incident on the GPL 1180 from the RHS thereof as is shown in a second arrangement 1120, it is first noticed that the optics-axis distribution is flipped as a consequence of inverse reflection symmetry, and becomes −r(x, y). Due to this flipping, the LHCP light beam is not converged but is diverged to give a RHCP light beam, so that the focal length of the GPL 1180 is −f. The results of the first and second arrangements 1110, 1120 indicate that the GPL 1180 is non-reciprocal. A third arrangement 1130 has a RHCP light beam traveling along the forward propagation direction 1101 and is incident on the GPL 1180 from the LHS thereof. The third arrangement 1130 is the same as the first arrangement 1110 except the handedness of the input light beam. As mentioned in explaining FIG. 1, the RHCP light beam diverges and forms a LHCP light beam, causing the focal length of the GPL 1180 to be −f. In a fourth arrangement 1140, a RHCP light beam travels along the backward propagation direction 1102 and is incident on the GPL 1180 from the RHS thereof. Based on a similar analysis, the RHCP light beam converges to give a LHCP light beam as an output, so that the focal length of the GPL 1180 is f. Comparison between the third and fourth arrangements 1130, 1140 also indicates that the GPL 1180 is polarization non-reciprocal.

Figure 12:
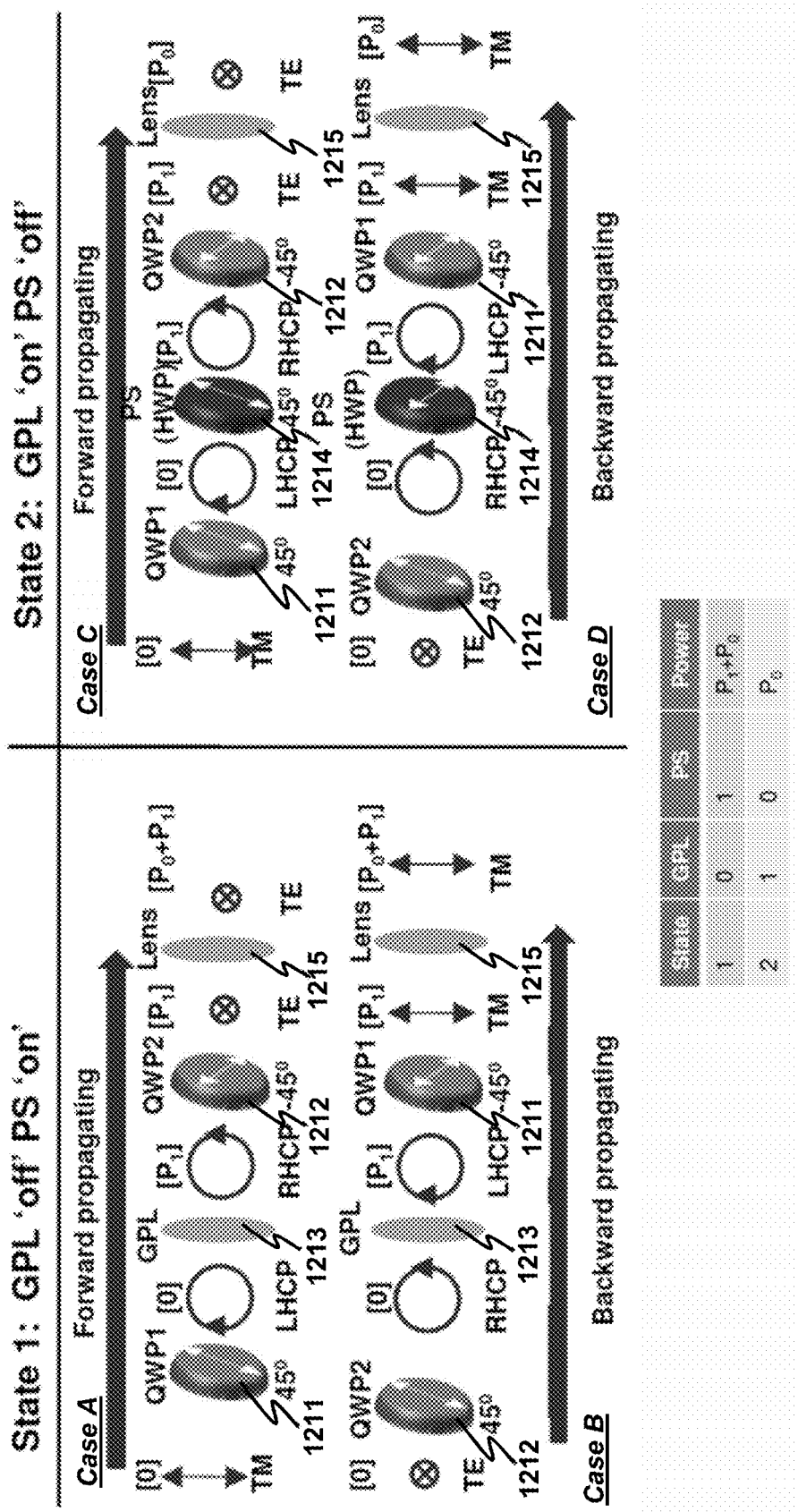
FIG. 12 shows an analysis of optical powers obtained by a variable-focusing module for both propagation directions, where the variable-focusing module has one focusing unit of FIG. 3A.
Figure 13:
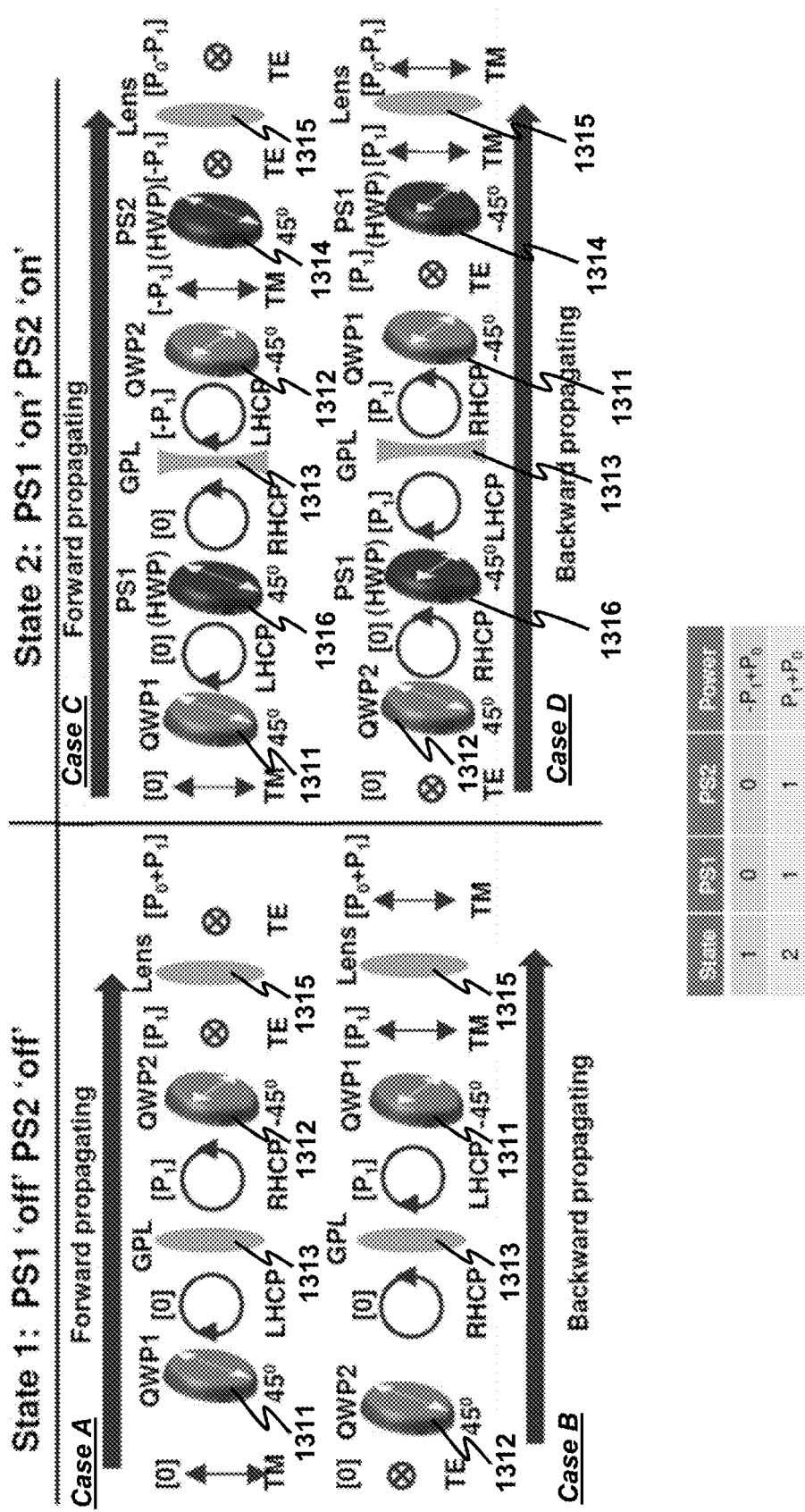
FIG. 13 shows another analysis of optical powers obtained by a variable-focusing module for both propagation directions, where the variable-focusing module has one focusing unit of FIG. 3B.

FIGS. 12 and 13 demonstrate that the same optical power is obtainable for two input LP light beams respectively traveling in the forward and backward propagation directions by keeping the two input LP light beams orthogonal in polarization orientation and configuring a variable-focusing module to have one input LP light beam and its output LP light beam orthogonal in polarization orientation. Each of FIGS. 12 and 13 shows an analysis of optical powers provided for both propagation directions by a variable-focusing module realized with one focusing unit as an example for illustration. An optical module equivalent to this variable-focusing module is used in the analysis. In FIG. 12, the focusing unit is realized according to FIG. 3A and has an active GPL for GPL switching. In FIG. 13, the focusing unit is realized according to FIG. 3B and has a PS and a GPL for waveplate switching. In each of the two figures, two states are obtained.

Refer to the equivalent optical module shown in FIG. 12. The variable-focusing module has a front-end QWP 1211, an active GPL 1213, a rear-end QWP 1212, a rear-end LC HWP 1214 and a conventional lens 1215. The active GPL 1213 in a voltage-off state has an optical power $P_1$ for an input LHCP light beam traveling in a forward propagation direction. The conventional lens 1215 has an optical power $P_0$. State 1 has the active GPL 1213 in a voltage-off state and the rear-end LC HWP 1214 in a voltage-on state. State 2 has the active GPL 1213 in a voltage-on state and the rear-end LC HWP 1214 in a voltage-off state. Both states are selected such that: (1) when a TM polarized light beam is incident to the variable-focusing module along the forward propagation direction, a TE polarized light beam is outputted; and (2) when a TE polarized light beam is incident to the variable-focusing module along the backward propagation direction, a TM polarized light beam is outputted. In State 1, Cases A and B depict that TM and TE polarized light beams are inputs to the variable-focusing module along the forward and backward propagation directions, respectively. Simple analysis finds that for both cases, the optical powers provided are the same and equal to $P_1+P_0$. In State 2, Cases C and D depict that TM and TE polarized light beams are inputs to the variable-focusing module along the forward and backward propagation directions, respectively. In both cases, similarly, the optical powers provided are the same and equal to $P_0$. Therefore, the variable-focusing module of FIG. 12 is reconfigurable for achieving different optical powers as well as simultaneously focuses LP light beams from both propagation directions with the same optical power.

Refer to the equivalent optical module shown in FIG. 13. The variable-focusing module has a front-end QWP 1311, a PS 1316 realized as a HWP, a GPL 1313, a rear-end QWP 1312, a rear-end LC HWP 1314 and a conventional lens 1315. The GPL 1313 has an optical power $P_1$ for an input LHCP light beam traveling in a forward propagation direction. The conventional lens 1315 has an optical power $P_0$. State 1 has both the PS 1316 and the rear-end LC HWP 1314 in a voltage-off state. State 2 has both the PS 1316 and the rear-end LC HWP 1314 in a voltage-on state. Again, both states are selected such that: (1) when a TM polarized light beam is incident to the variable-focusing module along the forward propagation direction, a TE polarized light beam is outputted; and (2) when a TE polarized light beam is incident to the variable-focusing module along the backward propagation direction, a TM polarized light beam is outputted. In State 1, Cases A and B depict that TM and TE polarized light beams are inputs to the variable-focusing module along the forward and backward propagation directions, respectively. It is found that for both cases, the optical powers provided are the same and equal to $-P_1+P_0$. In State 2, Cases C and D depict that TM and TE polarized light beams are inputs to the variable-focusing module along the forward and backward propagation directions, respectively. It is also found that in both cases, the optical powers provided are the same and equal to $P_1+P_0$. Therefore, the variable-focusing module of FIG. 13 is reconfigurable for achieving different optical powers as well as simultaneously focuses LP light beams traveling from both propagation directions with the same optical power.

The analysis of optical powers for both propagation directions when the variable-focusing module has a single focusing unit of FIG. 3C is similar, and is not given here for brevity.

The second multifocal system as disclosed herein is developed based on simultaneous focusing of two light beams.

Figure 9:
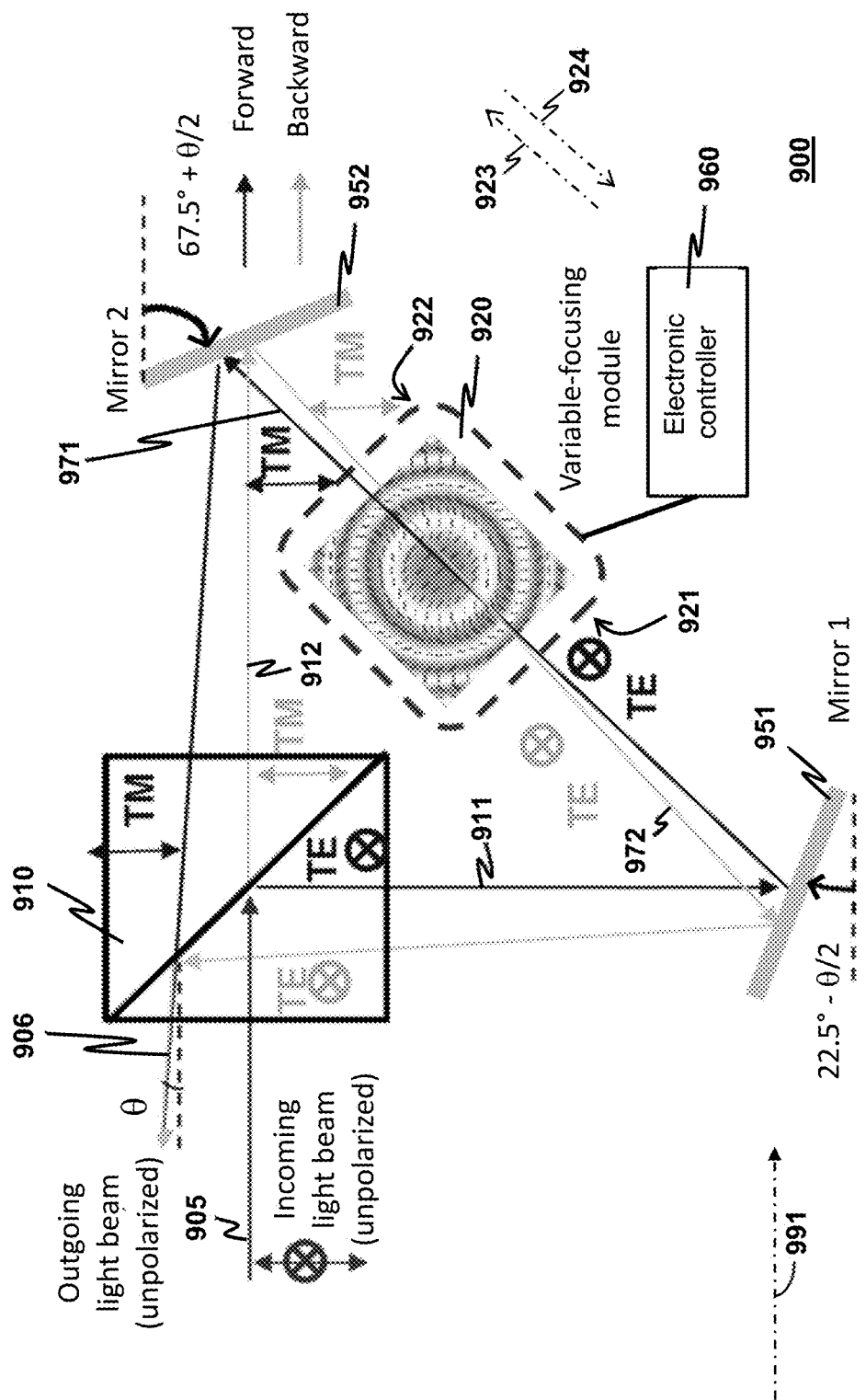
FIG. 9 depicts a second multifocal system for focusing an incoming light beam to form an outgoing light beam, where radiation power of the incoming light beam is fully utilized in creating the outgoing light beam as well as a reduction in required hardware is achieved.

Exemplarily, the second multifocal system is shown in FIG. 9, which depicts a second multifocal system 900 that receives an incoming light beam 905, which is unpolarized, and generates an outgoing light beam 906, which is also unpolarized. The system 900 comprises a PBS 910, a variable-focusing module 920, a first mirror 951, a second mirror 952, and an electronic controller 960.

The PBS 910 is arranged to split the incoming light beam 905 into a first LP light beam 911 and a second LP light beam 912. The first and second LP light beams 911, 912 are mutually orthogonal to each other in polarization orientation. As an example depicted in FIG. 9, the first and second LP light beams 911, 912 are selected to be TE and TM polarized light beams, respectively.

The variable-focusing module 920 is realized as any of the embodiments of the disclosed variable-focusing module 700. The variable-focusing module 920 has a first end 921 and a second end 922 such that a certain input LP light beam is allowed to enter into the variable-focusing module 920 through one of the two ends 921, 922 so as to generate a certain output LP light beam leaving from another one of the two ends 921, 922. A forward propagation direction 923 is defined as a direction from the first end 921 towards the second end 922. A backward propagation direction 924 is defined as a direction from the second end 922 towards the first end 921.

The first and second mirrors 951, 952 are positioned or arranged such that the following results are obtained. First, the first mirror 951 reflects the first LP light beam 911 emitted from the PBS 910 towards the first end 921, causing the first LP light beam 911 to travel along the forward propagation direction 923 in the variable-focusing module 920 to thereby form a third LP light beam 971 leaving from the second end 922. Second, the second mirror 952 reflects the third LP light beam 971 emitted from the second end 922 to the PBS 910. Third, the second mirror 952 reflects the second LP light beam 912 emitted from the PBS 910 to the second end 922, causing the second LP light beam 912 to travel in the backward propagation direction 924 in the variable-focusing module 920 to thereby form a fourth LP light beam 972 leaving from the first end 921. Fourth, the first mirror 951 reflects the fourth LP light beam 972 leaving from the first end 921 to the PBS 910.

In one embodiment, the above-mentioned results are obtained by an exemplary geometric arrangement as shown in FIG. 9. Positions of the PBS 910, the first mirror 951 and the second mirror 952 are selected such that these three optical elements form a triangle close to a right-angle triangle with the PBS 910 making a right angle with the two mirrors 951, 952. Preferably, the right-angle triangle is an isosceles right triangle. Consider a reference axis 991 in parallel to an incident direction of the incoming light beam 905 entering into the PBS 910. The PBS 910 forms the first and second LP light beams 911, 912 where the first LP light beam 911 travels in a direction perpendicular to the reference axis 991 while the second LP light beam 912 travels in a direction along the reference axis 991. In case that the above-mentioned three optical elements form a triangle close to an isosceles right triangle, the first and second mirrors 951, 952 are advantageously positioned such that the first mirror 951 and the second mirror 952 make angles of 22.5°−θ/2 and 67.5°+θ/2 from the reference axis 991, respectively, where θ is a non-zero angle offset. Then the outgoing light beam 906 has a traveling direction making an angle of θ from the reference axis 991. The advantage to have a non-zero value of θ is to enable the outgoing light beam 906 to diverge away from the incoming light beam 905 when the outgoing light beam 906 travels. If the two light beams 905, 906 travel in a substantially parallel direction, direct back reflection occurs and the outgoing light beam 906 is not separable from the incoming light beam 905. The non-zero angle offset θ may be positive or negative, such that the outgoing light beam 906 may deviate upwardly or downwardly with reference to FIG. 9. Those skilled in the art may determine an appropriate value of θ according to the clearance required between the two light beams 905, 906 such that the outgoing light beam 906 is separable from the incoming light beam 905.

The electronic controller 960 is configured and programmed to perform the following tasks. A first task is to configure the optical assembly 200 in the variable-focusing module 920 to provide a desired optical power in focusing the first LP light beam 911 traveling in the forward propagation direction 923. As a result, the first LP light beam 911 is focused in the variable-focusing module 920 with the desired optical power. A second task is to configure the rear-end LC HWP 740 in the variable-focusing module 920 such that the first LP light beam 911 and the third LP light beam 971 are orthogonal to each other in polarization orientation. It follows that the second LP light beam 912 and the third LP light beam 971 are same in polarization orientation, causing the second LP light beam 912 to be focused in the variable-focusing module 920 with the same desired optical power in forming the fourth LP light beam 972. Furthermore, the second and fourth LP light beams 912, 972 are orthogonal to each other in polarization orientation.

The electronic controller 960 may be implemented by, e.g., a general-purpose computing processor, a special-purpose processor, a microcontroller, an ASIC, any programmable device such as a FPGA, or a combination thereof. Peripheral devices such as line drivers for driving the optical assembly 200 may be included in the implementation of the electronic controller 960. Those skilled in the art will appreciate that other practical implementations of the electronic controller 960 are possible and can be designed according to knowledge in the art.

Additionally, the PBS 910 is further arranged, and reused, to combine the received third and fourth LP light beams 971, 972 to form the outgoing light beam 906. The radiation power of the incoming light beam 905 is therefore fully utilized in creating the outgoing light beam 906 while allowing the desired optical power in focusing the incoming light beam 905 to be variable and selectable to support multifocal focusing. Furthermore, only one variable-focusing module is used in the second multifocal system 900, reducing a requirement on hardware in comparison to the first multifocal system 800.

A third aspect of the present invention is to provide a multifocal AR display for augmenting an external image onto a real-world scene during user viewing. The display supports multifocal focusing by including the first multifocal system 800 or the second multifocal system 900.

Figure 10:
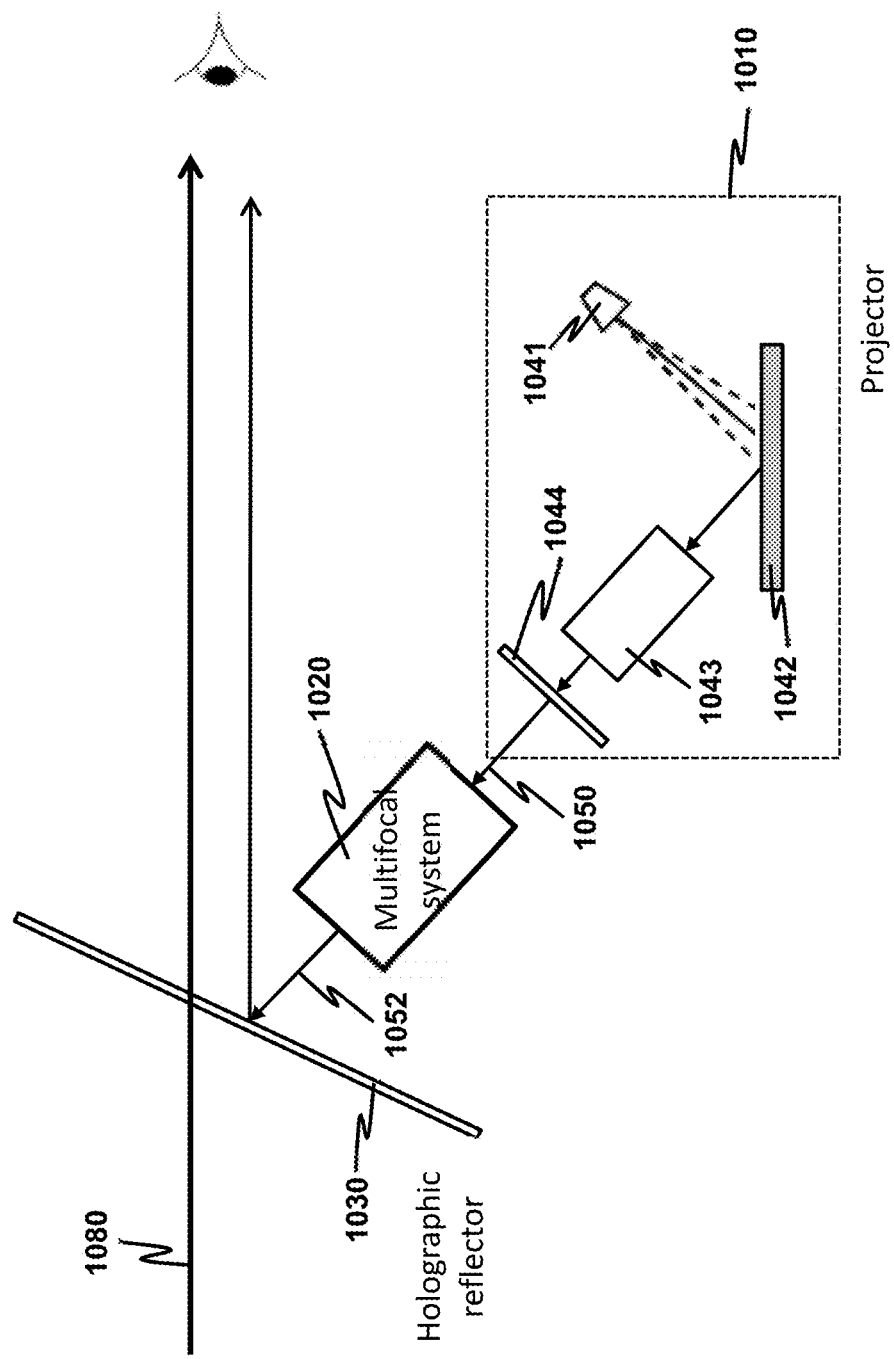
FIG. 10 depicts, in accordance with certain embodiments of the present invention, a multifocal AR display for augmenting an external image onto a real-world scene during user viewing, where the first or second multifocal system is used therein for supporting multifocal focusing.

FIG. 10 depicts a multifocal AR display 1000 in accordance with certain embodiments of the present invention. The multifocal AR display 1000 comprises a projector 1010, a multifocal system 1020 and a holographic reflector 1030. The projector 1010 is used to generate an image-carrying light beam 1050 that carries the external image. The multifocal system 1020 is realized as any of the embodiments of the first multifocal system 800 and of the second multifocal system 900. In the multifocal AR display 1000, the multifocal system 1020 is used to focus the image-carrying light beam 1050 to form a modified image-carrying light beam 1052 such that multifocal focusing is provided in focusing the image-carrying light beam 1050. The holographic reflector 1030 is arranged to reflect the modified image-carrying light beam 1052 while allowing passage of a light beam 1080 that carries an image of the real-world scene. As a result, the external image is augmented to the real-world scene during user viewing.

In certain embodiments, the projector 1010 comprises an optical diffuser 1044, a microdisplay 1042, a light source 1041 and a lens module 1043. The microdisplay 1042 is used to display the external image. The light source 1041 is used for illuminating the microdisplay 1042 to project the external image on the diffuser 1044, so as to cause the diffuser 1044 to emit the image-carrying light beam 1050 to be received by the multifocal system 1020. The lens module 1043 is positioned between the microdisplay 1042 and the diffuser 1044 for focusing the external image originally displayed on the microdisplay 1042 onto the diffuser 1044. In one embodiment, the microdisplay 1042 is a spatial light modulator, such as the one disclosed in US 2018/0164643A1.

Although the optical assembly 200, the variable-focusing module 700 and the first and second multifocal systems 800, 900 are particularly useful for building optical systems used in the field of AR, the present invention is not limited only to AR applications. The present invention may be used for applications in other technical areas, such as the development of advanced microscopes.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A multifocal system for focusing an incoming light beam to form an outgoing light beam, the system comprising:
    a first polarization beam splitter (PBS) for splitting the incoming light beam into first and second linearly-polarized (LP) light beams mutually orthogonal to each other in polarization orientation;
    first and second variable-focusing modules for focusing the first and second LP light beams to generate third and fourth LP light beams, respectively, wherein an individual variable-focusing module for focusing an input LP light beam to form an output LP light beam is electrically reconfigurable for supporting multifocal focusing;
    an electronic controller configured to configure the individual variable-focusing module to provide a desired optical power in focusing the input LP light beam such that the first and second LP light beams are focused with the same desired optical power; and
    a second PBS for combining the third and fourth LP light beams to generate the outgoing light beam, whereby radiation power of the incoming light beam is fully utilized in creating the outgoing light beam while allowing the desired optical power in focusing the incoming light beam to be variable and selectable to support multifocal focusing;

wherein:
    the individual variable-focusing module comprises:
        a front-end quarter waveplate (QWP) for converting the input LP light beam into an incident circularly-polarized (CP) light beam;
        an optical assembly configured to provide an optical power for focusing the incident CP light beam to form an exit CP light beam, the optical assembly being formed with a stack of optical elements including at least one geometric phase lens (GPL), the optical assembly being electrically reconfigurable for supporting multifocal focusing;
        a rear-end QWP for converting the exit CP light beam to a first intermediate LP light beam; and
        a rear-end liquid crystal (LC) half waveplate (HWP) for transforming the first intermediate LP light beam into the output LP light beam, the rear-end LC HWP being electrically reconfigurable to either maintain or 90°-rotate a polarization orientation of the first intermediate LP light beam in forming the output LP light beam;
    and
    the electronic controller is further configured:
        to configure the optical assembly to provide the desired optical power in focusing the incident CP light beam; and
        to configure the rear-end LC HWP such that the third and fourth LP light beams are orthogonal to each other in polarization orientation.

2. The system of claim 1, wherein the individual variable-focusing module further comprises an additional lens for further focusing the output LP light beam before the output LP light beam exits the individual variable-focusing module.

3. The system of claim 1 further comprising:
    an additional lens for further focusing the outgoing light beam before the outgoing light beam exits the system.

4. The system of claim 1, wherein:
    the optical assembly is formed by serially cascading plural focusing units;
    an individual focusing unit for focusing an input CP light beam to form an output CP light beam comprises a single lens for providing an incremental optical power in focusing the input CP light beam, wherein the incremental optical power contributes to the optical power provided by the optical assembly; and
    at least one of the focusing units is reconfigurable, the lens of an individual reconfigurable focusing unit being a GPL, wherein the individual reconfigurable focusing unit is electrically controllable to change the incremental focusing power provided by said GPL via controllably modifying a handedness of the input CP light beam to a predetermined handedness before the input CP beam enters into said GPL or via controllably activating and deactivating said GPL, causing the optical power provided by the optical assembly to be variable and selectable, whereby multifocal focusing is supported.

5. The system of claim 4, wherein the individual reconfigurable focusing unit further comprises a polarization selector (PS) for controllably modifying the handedness of the input CP light beam to the predetermined handedness, the PS being electrically reconfigurable to either reverse or maintain the handedness of the input CP light beam before the input CP light beam enters into the GPL.

6. The system of claim 5, wherein the PS comprises a liquid LC HWP electrically reconfigurable to either function as a normal HWP or function as an isotropic transparent medium.

7. The system of claim 5, wherein the PS comprises:
a first QWP for converting a first CP light beam into a first LP light beam, the first CP light beam being the input CP light beam that enters into the individual reconfigurable focusing unit;
an in-plane switching (IPS) LC HWP for transforming the first LP light beam into a second LP light beam, the IPS LC HWP being electrically reconfigurable to either maintain or 90°-rotate a polarization orientation of the first LP light beam in forming the second LP light beam; and
a second QWP for converting the second LP light beam into a second CP light beam, the second CP light beam being the input CP light beam having the predetermined handedness.

8. The system of claim 4, wherein said GPL is an active GPL electrically reconfigurable to either function as a normal GPL or function as an isotropic transparent medium without focusing the input CP light beam, thereby enabling said GPL to be controllably activated and deactivated.

9. A multifocal augmented-reality (AR) display for augmenting an external image onto a real-world scene during user viewing, the multifocal AR display comprising:
a projector for generating an image-carrying light beam that carries the external image;
the multifocal system of claim 1 for focusing the image-carrying light beam to form a modified image-carrying light beam and for providing multifocal focusing in focusing the image-carrying light beam; and
a holographic reflector arranged to reflect the modified image-carrying light beam while allowing passage of a light beam that carries an image of the real-world scene so as to augment the external image onto the real-world scene during user viewing.

10. The multifocal AR display of claim 9, wherein the projector comprises:
an optical diffuser;
a spatial light modulator for displaying the external image;
a light source for illuminating the spatial light modulator to project the external image on the diffuser, causing the diffuser to emit the image-carrying light beam to be received by the multifocal system; and
a lens module positioned between the spatial light modulator and the diffuser for focusing the external image originally displayed on the spatial light modulator onto the diffuser.

11. A multifocal system for focusing an incoming light beam to form an outgoing light beam, the system comprising:
a polarization beam splitter (PBS) arranged to split the incoming light beam into first and second linearly-polarized (LP) light beams mutually orthogonal to each other in polarization orientation;
a variable-focusing module for focusing an input LP light beam to form an output LP light beam, the variable-focusing module having a first end and a second end such that the input LP light beam is allowed to enter into the variable-focusing module through one of the two ends to generate the output LP light beam leaving from another one of the two ends, a forward propagation direction being defined as a direction from the first end towards the second end, a backward propagation direction being defined as a direction from the second end towards the first end, the variable-focusing module comprising:
a front-end quarter waveplate (QWP) located at the first end for converting the input LP light beam received at the first end into an incident circularly-polarized (CP) light beam, both the input LP light beam and the incident CP light beam traveling in the forward propagation direction;
an optical assembly configured to provide an optical power for focusing the incident CP light beam to form an exit CP light beam, the optical assembly being formed with a stack of optical elements including at least one geometric phase lens (GPL), the optical assembly being electrically reconfigurable for supporting multifocal focusing;
a rear-end QWP for converting the exit CP light beam to a first intermediate LP light beam; and
a rear-end liquid crystal (LC) half waveplate (HWP) located at the second end for transforming the first intermediate LP light beam into the output LP light beam leaving from the second end, the rear-end LC HWP being electrically reconfigurable to either maintain or 90°-rotate a polarization orientation of the first intermediate LP light beam in forming the output LP light beam;
first and second mirrors both arranged such that:
the first mirror reflects the first LP light beam emitted from the PBS to the first end, causing the first LP light beam to travel along the forward propagation direction in the variable-focusing module to thereby form a third LP light beam leaving from the second end;
the second mirror reflects the third LP light beam emitted from the second end to the PBS;
the second mirror reflects the second LP light beam emitted from the PBS to the second end, causing the second LP light beam to travel in the backward propagation direction in the variable-focusing module to thereby form a fourth LP light beam leaving from the first end; and
the first mirror reflects the fourth LP light beam leaving from the first end to PBS;
and
an electronic controller configured:
to configure the optical assembly to provide a desired optical power in focusing the incident CP light beam traveling in the forward propagation direction, whereby the first LP light beam is focused in the variable-focusing module with the desired optical power; and
to configure the rear-end LC HWP such that the first and third LP light beams are orthogonal to each other in polarization orientation so that the second and third LP light beams are same in polarization orientation, causing the second LP light beam to be focused in the variable-focusing module with the same desired optical power in forming the fourth LP light beam with the second and fourth LP light beams being orthogonal to each other in polarization orientation, thereby allowing the variable-focusing module to be reused in simultaneously focusing the first and second LP light beams;
wherein the PBS is further arranged to combine the received third and fourth LP light beams to form the outgoing light beam, whereby radiation power of the incoming light beam is fully utilized in creating the outgoing light beam while allowing the desired optical power in focusing the incoming light beam to be variable and selectable to support multifocal focusing.

12. The system of claim 11, wherein the first and second mirrors make angles of 22.5°−θ/2 and 67.5°+θ/2 from a reference axis, respectively, the reference axis being in parallel to an incident direction of the incoming light beam that enters into the PBS, θ being a non-zero angle offset to thereby enable the outgoing light beam to diverge away from the incoming light beam when the outgoing light beam travels so as to avoid occurrence of direct back reflection.

13. The system of claim 11, wherein:
the optical assembly is formed by serially cascading plural focusing units;
an individual focusing unit for focusing an input CP light beam to form an output CP light beam comprises a single lens for providing an incremental optical power in focusing the input CP light beam, wherein the incremental optical power contributes to the optical power provided by the optical assembly; and
at least one of the focusing units is reconfigurable, the lens of an individual reconfigurable focusing unit being a GPL, wherein the individual reconfigurable focusing unit is electrically controllable to change the incremental focusing power provided by said GPL via controllably modifying a handedness of the input CP light beam to a predetermined handedness before the input CP beam enters into said GPL or via controllably activating and deactivating said GPL, causing the optical power provided by the optical assembly to be variable and selectable, whereby multifocal focusing is supported.

14. The system of claim 13, wherein the individual reconfigurable focusing unit further comprises a polarization selector (PS) for controllably modifying the handedness of the input CP light beam to the predetermined handedness, the PS being electrically reconfigurable to either reverse or maintain the handedness of the input CP light beam before the input CP light beam enters into the GPL.

15. The system of claim 14, wherein the PS comprises a LC HWP electrically reconfigurable to either function as a normal HWP or function as an isotropic transparent medium.

16. The system of claim 14, wherein the PS comprises:
a first QWP for converting a first CP light beam into a first LP light beam, the first CP light beam being the input CP light beam that enters into the individual reconfigurable focusing unit;
an in plane switching (IPS) LC HWP for transforming the first LP light beam into a second LP light beam, the IPS LC HWP being electrically reconfigurable to either maintain or 90°-rotate a polarization orientation of the first LP light beam in forming the second LP light beam; and
a second QWP for converting the second LP light beam into a second CP light beam, the second CP light beam being the input CP light beam having the predetermined handedness.

17. The system of claim 13, wherein said GPL is an active GPL electrically reconfigurable to either function as a normal GPL or function as an isotropic transparent medium without focusing the input CP light beam, thereby enabling said GPL to be controllably activated and deactivated.

18. A multifocal augmented-reality (AR) display for augmenting an external image onto a real-world scene during user viewing, the multifocal AR display comprising:
a projector for generating an image-carrying light beam that carries the external image;
the multifocal system of claim 11 for focusing the image-carrying light beam to form a modified image-carrying light beam and for providing multifocal focusing in focusing the image-carrying light beam; and
a holographic reflector arranged to reflect the modified image-carrying light beam while allowing passage of a light beam that carries an image of the real-world scene so as to augment the external image onto the real-world scene during user viewing.

19. The multifocal AR display of claim 18, wherein the projector comprises:
an optical diffuser;
a spatial light modulator for displaying the external image;
a light source for illuminating the spatial light modulator to project the external image on the diffuser, causing the diffuser to emit the image-carrying light beam to be received by the multifocal system; and
a lens module positioned between the spatial light modulator and the diffuser for focusing the external image originally displayed on the spatial light modulator onto the diffuser.

* * * * *